United States Patent
Sethi

(10) Patent No.: US 11,560,022 B2
(45) Date of Patent: Jan. 24, 2023

(54) ROTATABLE SMART WHEEL SYSTEMS AND METHODS

(71) Applicant: TDK CORPORATION, Tokyo (JP)

(72) Inventor: Rakesh Sethi, Saratoga, CA (US)

(73) Assignee: TDK CORPORATION, Tokyo (JP)

( * ) Notice: Subject to any disclaimer, the term of this patent is extended or adjusted under 35 U.S.C. 154(b) by 140 days.

(21) Appl. No.: 16/366,960

(22) Filed: Mar. 27, 2019

(65) Prior Publication Data

US 2020/0189326 A1     Jun. 18, 2020

Related U.S. Application Data

(60) Provisional application No. 62/778,501, filed on Dec. 12, 2018.

(51) Int. Cl.
    *B60R 16/03*     (2006.01)
    *B60C 11/24*     (2006.01)
    (Continued)

(52) U.S. Cl.
CPC ............ *B60C 11/243* (2013.01); *B60R 16/03* (2013.01); *G01B 17/02* (2013.01); *G01C 5/06* (2013.01); *G07C 5/0816* (2013.01)

(58) Field of Classification Search
CPC ....... B60C 11/24; B60C 11/243; B60C 23/00; B60C 23/04; B60C 23/041;
(Continued)

(56) References Cited

U.S. PATENT DOCUMENTS 3,699,367 A    10/1972   Thomas
5,473,938 A    12/1995   Handfield
(Continued)

FOREIGN PATENT DOCUMENTS

DE            2850787 A1    6/1980
DE    102008046230 A1    4/2009
(Continued)

OTHER PUBLICATIONS

Extended European Search Report in EP Application No. 19202300.0, dated Feb. 24, 2020, in 7 pages.
(Continued)

*Primary Examiner* — Sze-Hon Kong
*Assistant Examiner* — Chanmin Park
(74) *Attorney, Agent, or Firm* — Duane Morris LLP

(57) ABSTRACT

This application relates generally to sensor systems and, more particularly, relates to systems and methods for management of smart wheel sensors that collect actionable sensor data from a rotatable component of a vehicle's wheel. In certain embodiments, a system includes a vehicle body; a rotatable component configured to rotate relative to the vehicle body; an energy harvesting component disposed along a circumference of the rotatable component, wherein the energy harvesting component is configured to generate electric power based on a force to the rotatable component; a sensor configured to produce sensor data by using the electric power while disposed on the rotatable component; and at least one processor disposed within the vehicle body, the at least one processor configured to perform an action within the vehicle body based on a parameter value meeting a threshold value, wherein the parameter value is based on the sensor data.

20 Claims, 16 Drawing Sheets

(51) Int. Cl.
  *G01B 17/02* (2006.01)
  *G01C 5/06* (2006.01)
  *G07C 5/08* (2006.01)

(58) Field of Classification Search
  CPC ............ B60C 23/0411; B60C 23/0447; B60C 23/0479; B60C 23/0486; B60C 23/0491; B60C 23/0498; B60C 11/246; B60C 2019/004; B60R 16/03; G01B 17/02; G01C 5/06
  See application file for complete search history.

(56) References Cited

U.S. PATENT DOCUMENTS

| | | | |
|---|---|---|---|
| 5,825,286 A * | 10/1998 | Coulthard | B60C 23/009 340/447 |
| 6,291,901 B1 | 9/2001 | Cefo | |
| 9,754,430 B1 * | 9/2017 | Wolf | G07C 5/0833 |
| 2001/0022551 A1 | 9/2001 | Barnett | |
| 2002/0075145 A1 | 6/2002 | Hardman et al. | |
| 2002/0188392 A1 * | 12/2002 | Breed | B60R 21/01552 701/45 |
| 2005/0065721 A1 * | 3/2005 | Herrtwich | G01C 21/3632 701/408 |
| 2005/0134444 A1 | 6/2005 | Park et al. | |
| 2005/0223788 A1 | 10/2005 | Mancosu et al. | |
| 2007/0279203 A1 * | 12/2007 | Thomas | B60C 23/0472 340/447 |
| 2008/0061625 A1 | 3/2008 | Schmitt et al. | |
| 2009/0046538 A1 * | 2/2009 | Breed | B60R 25/102 367/93 |
| 2009/0071238 A1 | 3/2009 | Crano | |
| 2010/0083747 A1 | 4/2010 | Fink et al. | |
| 2010/0164705 A1 * | 7/2010 | Blanchard | B60C 23/0411 340/442 |
| 2011/0203710 A1 * | 8/2011 | Hinojosa, Jr. | B60C 23/04 152/419 |
| 2012/0326565 A1 * | 12/2012 | Kuisma | B60C 23/0411 310/329 |
| 2014/0070935 A1 | 3/2014 | Wang | |
| 2015/0005982 A1 | 1/2015 | Muthukumar | |
| 2015/0029016 A1 | 1/2015 | Lesesky et al. | |
| 2015/0068297 A1 | 3/2015 | Duffy et al. | |
| 2016/0016445 A1 * | 1/2016 | Peine | B60C 23/0486 73/146.5 |
| 2017/0040911 A1 * | 2/2017 | Tatarchuk | H02K 11/0094 |
| 2018/0222260 A1 * | 8/2018 | Xue | B60C 23/0452 |
| 2020/0114706 A1 * | 4/2020 | Vivek | H01L 41/1132 |

FOREIGN PATENT DOCUMENTS

| | | |
|---|---|---|
| DE | 102013202800 A1 | 8/2014 |
| EP | 2040942 A1 | 4/2009 |
| WO | 2001068388 A1 | 9/2001 |
| WO | 2014/011129 A1 | 1/2014 |

OTHER PUBLICATIONS

International Search Report in International Patent Application No. PCT/US19/64884, dated Feb. 25, 2020, in 2 pages.

* cited by examiner

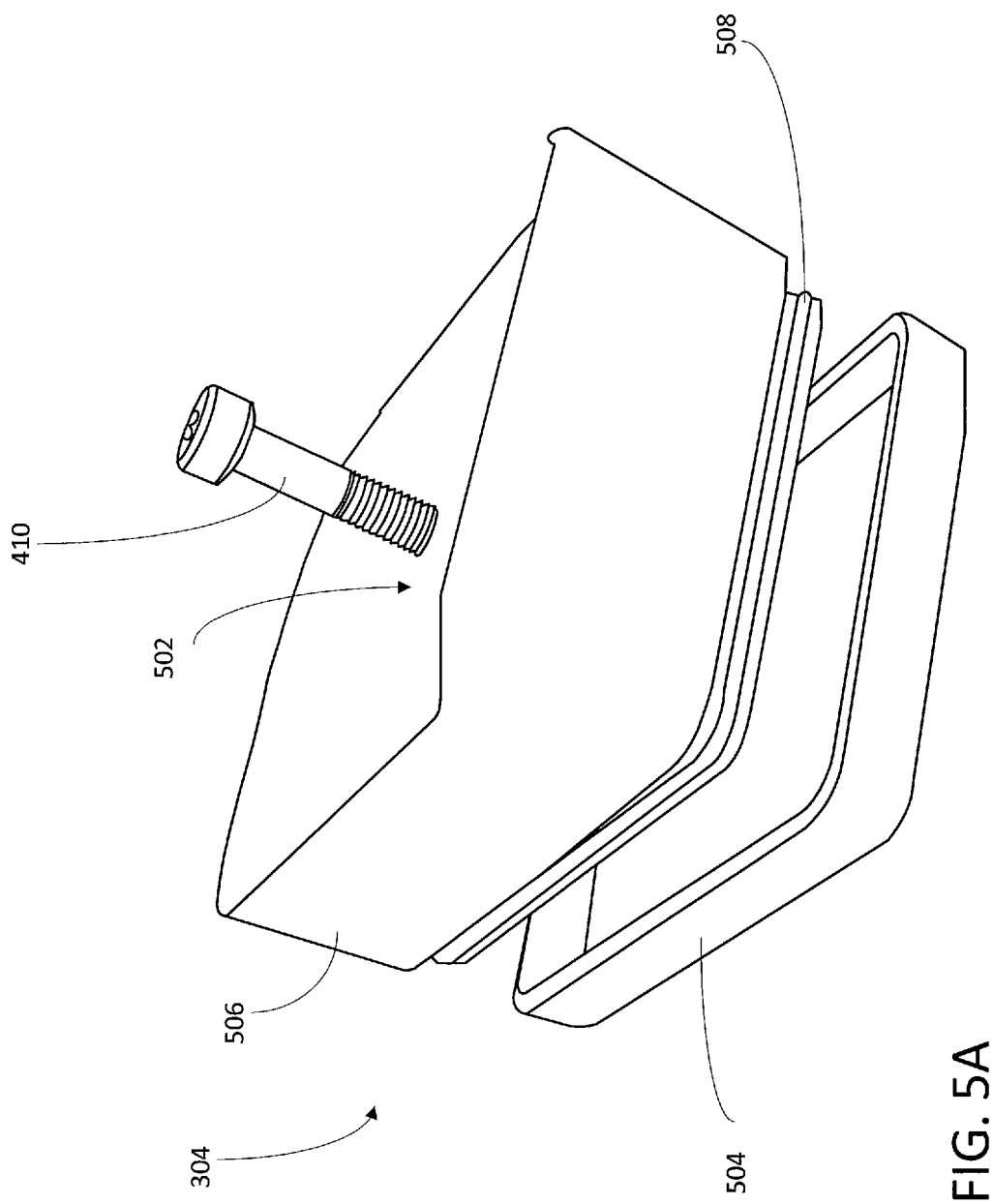

ROTATABLE SMART WHEEL SYSTEMS AND METHODS

CROSS-REFERENCE TO RELATED APPLICATIONS

The present application claims priority benefit of U.S. Provisional Application No. 62/778,501, filed on Dec. 12, 2018, the contents of which are incorporated by reference in its entirety.

TECHNICAL FIELD

This application relates generally to sensor systems and, more particularly, relates to systems and methods for management of smart wheel sensors that collect actionable sensor data from a rotatable component of a vehicle's wheel.

BACKGROUND

An inertial navigation system (INS) may be utilized to determine a position, orientation, and velocity of a moving object. An INS may include, for example, accelerometers and rotation sensors to continuously calculate the position, orientation, and velocity of the moving object by dead reckoning without the need for external references. An INS is typically centrally disposed on a static part of a chassis of a vehicle, and not on a moving part such as a wheel, so as to provide more accurate readings. However, the data gathered by an INS may be limited to only that sensed from the static part of the chassis of the vehicle. Therefore, there may be a need for improved sensor systems that are not as limited.

The foregoing examples of the related art and limitations related therewith are intended to be illustrative and not exclusive. Other limitations of the related art will become apparent upon a reading of the specification and a study of the drawings.

SUMMARY

The exemplary embodiments disclosed herein are directed to solving the issues relating to one or more of the problems presented in the prior art, as well as providing additional features that will become readily apparent by reference to the following detailed description when taken in conjunction with the accompanied drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In certain embodiments, a system includes a vehicle body; a rotatable component configured to rotate relative to the vehicle body; an energy harvesting component disposed along a circumference of the rotatable component, wherein the energy harvesting component is configured to generate electric power based on a force to the rotatable component; a sensor configured to produce sensor data by using the electric power while disposed on the rotatable component; and at least one processor disposed within the vehicle body, the at least one processor configured to perform an action at the vehicle body based on a parameter value meeting a threshold value, wherein the parameter value is based on the sensor data.

In certain embodiments, the rotatable component comprises a rim, wherein the rim includes an outer facing surface opposite an inner facing surface in which the circumference of the rotatable component is bound, where the sensor is located within a sensor housing along the inner facing surface.

In certain embodiments, the energy harvesting component is located along the outer facing surface and is connected with the sensor housing via a pin passing through the rim.

In certain embodiments, the sensor housing includes multiple sensors within the sensor housing.

In certain embodiments, the sensor housing is adjacent a sidewall of the rim.

In certain embodiments, the sensor housing includes a cover configured to be removably attached to reveal the sensor.

In certain embodiments, the system further includes: a tire coupled to the rotatable component, where the tire when inflated is configured to transfer the force to the rotatable component resulting from compressive force acting on a portion of the tire making contact with a road, where the energy harvesting component is configured to capture a kinetic energy in response to the compressive force acting on the portion of the tire making contact with the road as the rotatable component rotates, where the energy harvesting component is configured to power the sensor.

In certain embodiments, the energy harvesting component includes an energy harvesting material configured to deform in response to the compressive force.

In certain embodiments, energy harvested by the energy harvesting component is configured to activate the sensor.

In certain embodiments, the system further includes: a rim set that includes multiple rims that are each configured to rotate relative to the vehicle body, where the rotatable component is part of the rim set; and a sensor set that includes multiple sensors that are configured to produce combined sensor data while disposed on different rims, where the sensor is part of the sensor set, where the at least one processor is further configured to: receive the combined sensor data, and determine the parameter value from the combined sensor data.

In certain embodiments, the at least one processor is further configured to determine an outlier value as the threshold value using a statistical model applied to the combined sensor data.

In certain embodiments, a method includes: receiving, at a processor located within a vehicle body, sensor data from a sensor powered by force applied to a rotatable component, wherein the sensor is configured to produce sensor data while disposed on the rotatable component, where the rotatable component is configured to rotate relative to the vehicle body; determining a parameter value based on the sensor data; and performing an action based on the parameter value meeting a threshold value.

In certain embodiments, the sensor is at least one of: a height sensor configured to produce barometric pressure sensor data, an acoustic sensor configured to produce acoustic sensor data, an image sensor configured to produce image sensor data, a gas sensor configured to produce gas sensor data, a magnetic sensor configured to produce magnetic sensor data, an accelerometer sensor configured to produce acceleration sensor data, a gyroscope sensor configured to produce gyroscopic sensor data, and a humidity sensor configured to produce humidity sensor data.

In certain embodiments, the parameter value is based on the sensor data and data received from a remote server.

In certain embodiments, the sensor is configured to send the sensor data to the processor via a wireless connection.

In certain embodiments, the wireless connection bypasses a vehicle bus.

Certain embodiments include a non-transitory computer readable medium having instructions stored thereon, where the instructions, when executed by a processor, cause a device to perform operations including: activating a sensor by compressive force acting on a rotatable component, where the sensor is configured to produce sensor data while disposed on the rotatable component; receiving, at the processor located within a vehicle body, sensor data from the sensor, where the rotatable component is configured to rotate relative to the vehicle body; determining a parameter value based on the sensor data; and performing an action based on the parameter value meeting a threshold value.

In certain embodiments, the operations further comprise: determining a historical average based on the sensor data, and determining an outlier value from the historical average, where the outlier value is the threshold value.

In certain embodiments, the sensor data is barometric pressure sensor data, and the operations further comprise: determining an elevation parameter value based on the barometric pressure sensor data, where the elevation parameter value characterizes an elevation of the rotatable component relative to other rotatable components configured to rotate relative to the vehicle body, and producing an alert when the elevation parameter value meets the threshold value.

In certain embodiments, the sensor data is acoustic sensor data, and the operations further comprise: determining an audio parameter value based on the acoustic sensor data, where the audio parameter value characterizes a sound detectible from the rotatable component, and producing an alert for tire tread erosion or rotor-shoe erosion when the audio parameter value meets the threshold value.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

FIG. 5A illustrates a perspective view of a sensor housing with a conductive pin, in accordance with various embodiments.

DETAILED DESCRIPTION OF EXEMPLARY EMBODIMENTS

Figure 1:
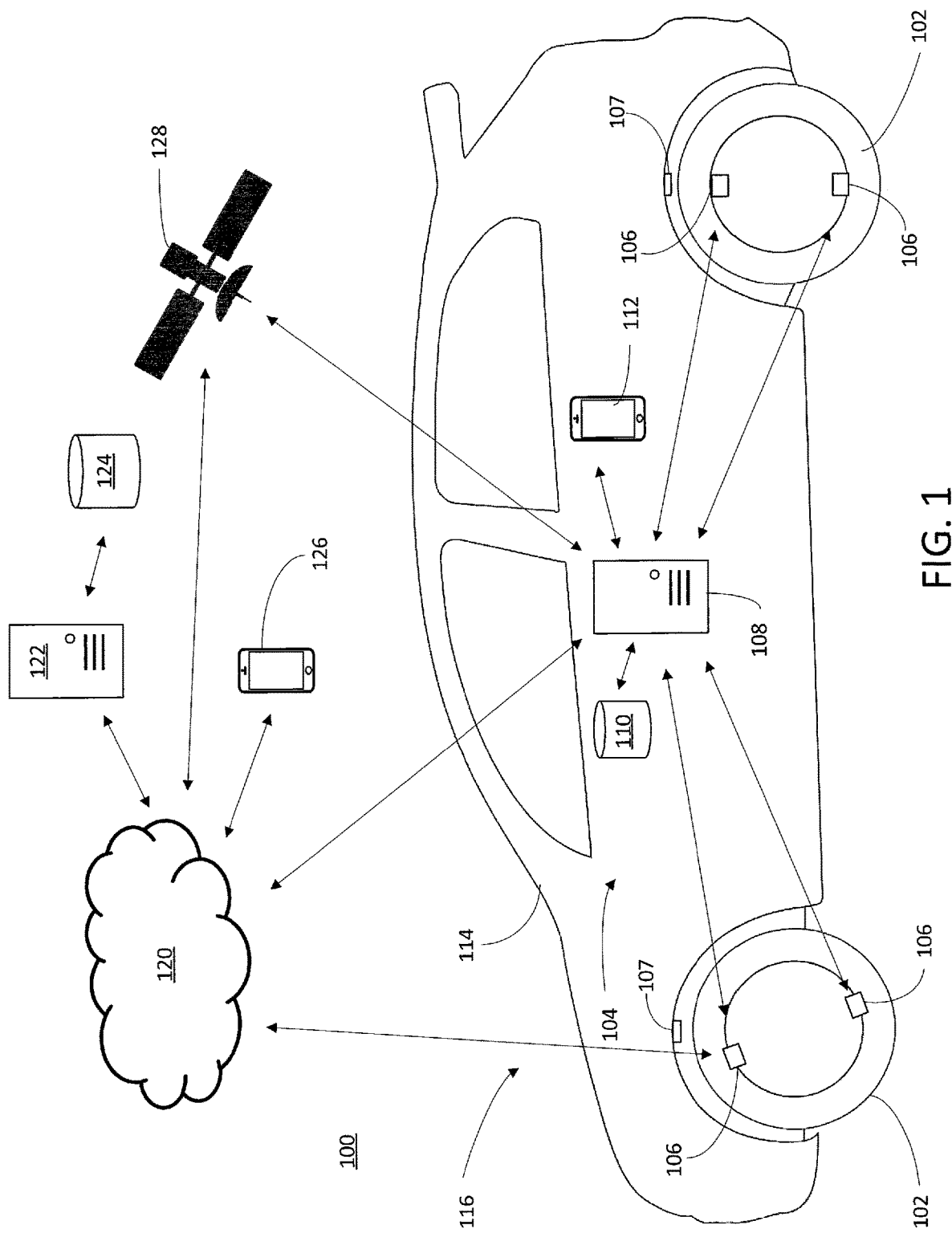
FIG. 1 is a diagram of a smart wheel sensor system that integrates a smart wheel, in accordance with various embodiments.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be rearranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

As noted above, an inertial navigation system (INS) may be utilized to determine a position, orientation, and velocity of a moving object on a centralized, static part of a vehicle. The INS does not collect sensor data from a moving part such as a wheel. Furthermore, the INS is typically powered by a centralized power source of the vehicle, such as the vehicle's engine or a centralized battery. Additionally, sensors for a wheel such as a pressure monitoring device may rely on a low speed controller area network (CAN) bus to communicate.

Accordingly, a new approach is proposed that contemplates systems and methods for operation and use of a smart wheel sensor system. The smart wheel sensor system may include at least one sensor arrayed on a wheel of a vehicle (e.g., a wheel driven object). Such a wheel interconnected with the smart wheel sensor system (e.g., with at least one sensor arrayed on the wheel) may be referred to as a smart wheel. The smart wheel sensor system may include multiple types of sensors, which may each be configured to collect different types of smart wheel sensor system data. For example, the smart wheel sensor system may include a height sensor configured to produce barometric pressure sensor data; an acoustic sensor configured to produce acoustic sensor data; an image sensor configured to produce image sensor data; a gas sensor configured to produce gas sensor data; a magnetic sensor configured to produce magnetic sensor data; an accelerometer sensor configured to produce acceleration sensor data; a gyroscope sensor configured to produce gyroscopic sensor data; and a humidity sensor configured to produce humidity sensor data. The smart wheel sensor system data produced by the smart wheel sensor system may be centrally and locally analyzed at a vehicle that relies upon the smart wheel for movement (e.g., by a computer or server within or supported by the vehicle's body) to determine a status of the vehicle and/or an individual smart wheel. Advantageously, the smart wheel sensor system may be implemented in an autonomous vehicle, such as part of a backup sensor system to augment the autonomous vehicle's safety system.

In various embodiments, the smart wheel sensor system data produced by the smart wheel sensor system may be entirely local without reliance on other remote data, such as satellite or map data. For example, the smart wheel sensor system data may harvest exogeneous data at, in, or near the smart wheel. Such exogenous data can be streamed to a consumer device and/or a vehicle advanced driver assist system (ADAS) to improve the drivability, safety, customer experience, or mission critical data for autonomous control purposes. This exogenous data may accordingly be used to generate a data stream such that on board or off board computation algorithms (e.g., via edge computing or cloud computing) may provide actionable data for the vehicle.

Furthermore, each smart wheel may have its own local sensors to produce smart wheel specific sensor data. This smart wheel specific sensor data may be utilized to assess the status of an individual smart wheel. Furthermore, this smart wheel specific sensor data may be stored (e.g., in a local datastore of a vehicle) such that smart wheel specific historical data may be associated with the individual smart wheel. Stated another way, a smart wheel may be identified, tracked, and managed throughout its lifetime with smart wheel specific sensor data associated with the smart wheel on which such smart wheel specific sensor data was produced. Furthermore, the sensors of the smart wheel sensor system may be powered from an energy harvesting component located locally on a respective smart wheel. For example, these sensors may be powered by an energy harvesting component that captures a kinetic energy in response to a compressive force acting on the smart wheel.

FIG. 1 is a diagram of a smart wheel sensor system 100 that integrates at least one smart wheel 102, in accordance with various embodiments. The smart wheel sensor system 100 may include a local sensor system 104 (e.g., a local smart wheel sensor system) of multiple sensor platforms 106 arrayed on respective smart wheels 102. This local sensor system 104 may include a local smart wheel server 108 that communicates with the sensors within the sensor platform 106. Accordingly, each sensor platform 106 may include at least one sensor and also include ancillary interfaces, such as communication interfaces, for communication with the local smart wheel server 108. This local smart wheel server 108 may also be in communication with a local smart wheel datastore 110 and any local user devices 112, such as a smartphone. For ease of explanation, the term local may refer to devices that are bound within or on a vehicle body 114 or a smart wheel 102 of a vehicle 116.

In contrast, the term remote may refer to devices that are outside of the vehicle body 114 or smart wheel 102 of the vehicle 116. For example, the local smart wheel server 108 may be configured to communicate with a remote network 120, such as the Internet. This remote network 120 may further connect the local smart wheel server 108 with remote servers 122 in communication with remote datastores 124 or remote user devices 126. In addition, the local smart wheel server 108 may be in communication with external sensors or devices, such as a remote satellite 128 for global positioning system (GPS) information.

In specific embodiments, at least one of the sensors within the sensor platform 106 may be configured to produce sensor data in conjunction with an emitter 107 on the vehicle body 114. For example, the emitter 107 may be configured to work as part of a time of flight sensor where a receiver is located with the sensor platform 106, as will be discussed further below.

In various embodiments, the sensor platform 106 may be configured to communicate with the local smart wheel server 108 via a communications interface. This communications interface may enable devices to communicate with each other over one or more communication networks following certain communication protocols, such as TCP/IP, http, https, ftp, and sftp protocols. Accordingly, the communications interface 280 may include any suitable hardware, software, or combination of hardware and software that is capable of coupling the sensor platform 106 with the local smart wheel server 108. The communications interface may be arranged to operate with any suitable technique for controlling information signals using a desired set of communications protocols, services or operating procedures. The communications interface may comprise the appropriate physical connectors to connect with a corresponding communications medium. In certain embodiments, this communications interface may be separate from a controller area network (CAN) bus. For example, the communications interface may facilitate wireless communications within the local sensor system 104 (e.g., between the sensor platforms 106 and the local smart wheel server 108). Further discussion of such a communications interface is provided in greater detail below.

In certain embodiments, the sensor platform 106 may be configured to communicate with the remote network 120. For example, the sensor platform 106 may communicate sensor data produced by the sensor platform 106 to the remote servers 122, the remote datastores 124, the remote user devices 126, and/or the remote satellite 128 via the remote network 120. In various embodiments, the sensor platform 106 may communicate directly with the remote network 120. For example, the sensor platform 106 may include communication interfaces (discussed further below) that may be configured to communicate directly with the remote network 120 in a manner that bypasses the local server 108. In other embodiments, the sensor platform 106 may communicate indirectly with the remote network 120. For example, the sensor platform 106 may include communication interfaces (discussed further below) that may be configured to communicate indirectly with the remote network 120 via the local server 108 (e.g., where the communications are routed through the local server 108 as an intermediary).

These communications from the sensor platform 106 to the remote server 122, whether direct or indirect, may include sensor data collected by the sensor platform for analysis by the remote server 122. This sensor data may be analyzed by the remote server 122 to determine an action that may be performed by the local server 108. For example, as will be discussed in further detail below, this sensor data may be utilized to determine a parameter value. Then certain actions may be performed based on the state of the parameter value, such as in response to the parameter value meeting certain threshold values (e.g., for an alert or notification presented via a user interface). This determination of a parameter value may be performed at the remote server and then the parameter values communicated to the local server 108 to determine the action to be performed based on the state of the parameter value. In other embodiments, this determination of a parameter value and the determination of the resultant action may be performed by the remote server. Then the remote server may communicate an indication of the action to be performed to the local server for implementation (e.g., as an instruction to the local server for implementation). Although certain embodiments describe sensor data as being communicated to a remote server for processing, sensor data may be processed in other manners as desired for different application in accordance with various embodiments. For example, the sensor data may be processed locally at the local server 108 with or without additional inputs provided from the remote server 122, remote user device, and/or remote satellite 128, as will be discussed further below.

Figure 2:
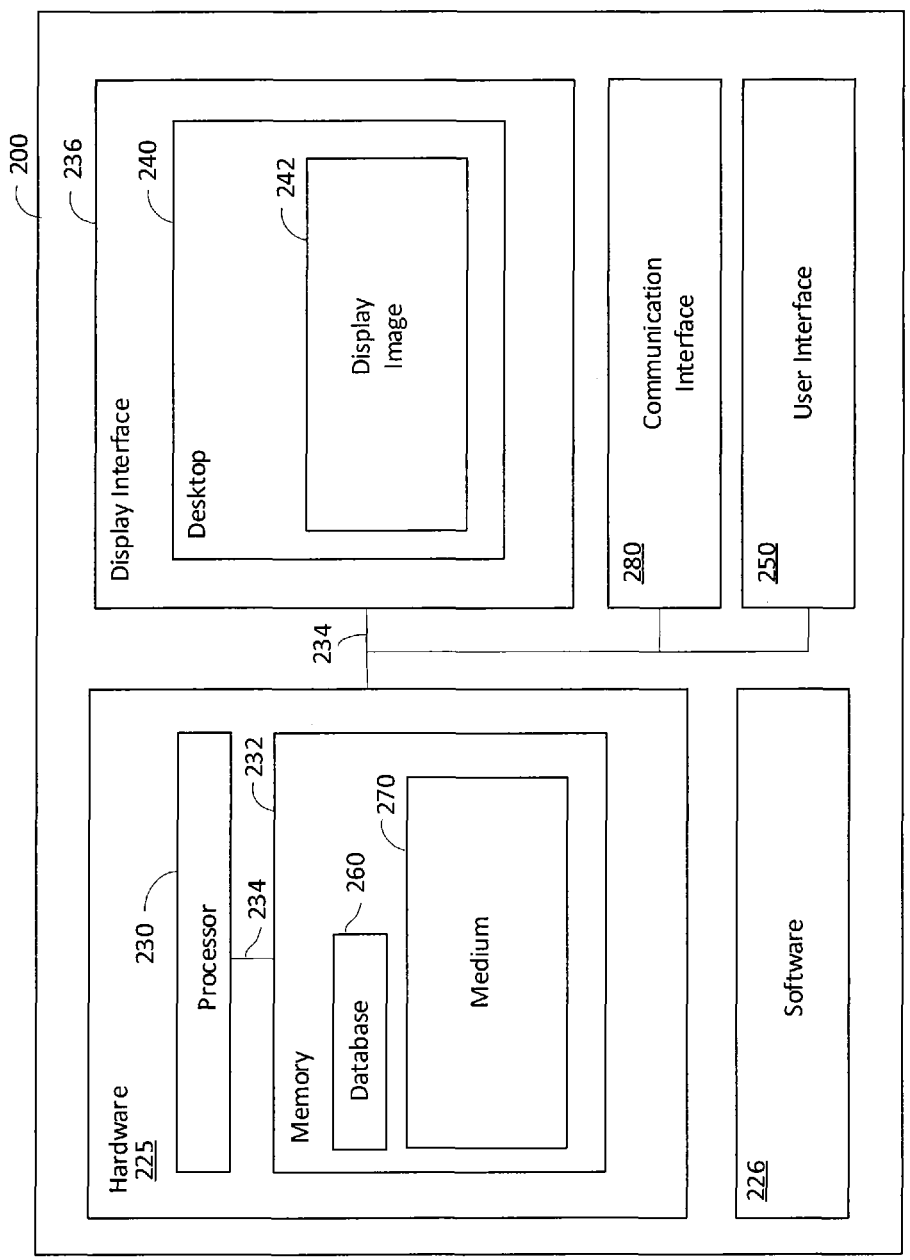
FIG. 2 is a block diagram of an exemplary computing device, in accordance with various embodiments.

FIG. 2 is a block diagram of an exemplary computing device 200, in accordance with various embodiments. As noted above, the computing device 200 may represent exemplary components of a particular local smart wheel server 108, local user device 112, remote server 122, remote user device 126, sensor platform 106, or remote satellite 128 as discussed above in connection with FIG. 1. Returning to FIG. 2, in some embodiments, the computing device 200 includes a hardware unit 225 and software 226. Software 226 can run on hardware unit 225 (e.g., the processing hardware unit) such that various applications or programs can be executed on hardware unit 225 by way of software 226. In some embodiments, the functions of software 226 can be implemented directly in hardware unit 225 (e.g., as a system-on-a-chip, firmware, field-programmable gate array ("FPGA"), etc.). In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an application specific integrated circuit (ASIC), a digital signal processor (DSP), an attached support processor (ASP), a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor." Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a number of GB of RAM. Memory 232 can also be a ROM, a network interface (NIC), and/or other device(s).

In some embodiments, the system bus 234 may couple each of the various system components together. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces. The system bus 234 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, optionally, the computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones). In some embodiments, computing device 200 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, the computing device 200 includes an input or a user interface 250 for receiving input from a user. User interface 250 may include, for example, a keyboard, a pointing device, a mouse, a stylus, a touch sensitive panel (e.g., a touch pad or a touch screen), a position detector, and/or an audio input device. A single component, such as a touch screen, may function as both an output device of the media output component and the input interface. In some embodiments, mobile devices, such as tablets, can be used.

In some embodiments, the computing device 200 can include a database 260 as a datastore within memory 232, such that various information can be stored within database 260. Alternatively, in some embodiments, database 260 can be included within a remote server (not shown) with file sharing capabilities, such that database 260 can be accessed by computing device 200 and/or remote end users. In some embodiments, a plurality of computer-executable instructions can be stored in memory 232, such as one or more computer-readable storage medium 270 (only one being shown in FIG. 2). Computer-readable storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein.

In the example of FIG. 2, the computing device 200 can be a communication device, a storage device, or any device capable of running a software component. For non-limiting examples, the computing device 200 can be but is not limited to a local smart wheel server, a local user device, a remote server, a remote user device, a sensor platform, a remote satellite, a smartphone, a laptop PC, a desktop PC, a tablet, a Google™ Android™ device, an iPhone®, an iPad®, and a voice-controlled speaker or controller.

The computing device 200 has a communications interface 280, which enables the computing devices to communicate with each other, the user, and other devices over one or more communication networks following certain communication protocols, such as TCP/IP, http, https, ftp, and sftp protocols. Here, the communication networks can be but are not limited to, the Internet, an intranet, a wide area network (WAN), a local area network (LAN), a wireless network, Bluetooth, WiFi, and a mobile communication network.

In some embodiments, the communications interface 280 may include any suitable hardware, software, or combination of hardware and software that is capable of coupling the computing device 200 to one or more networks and/or additional devices. The communications interface 280 may be arranged to operate with any suitable technique for controlling information signals using a desired set of communications protocols, services or operating procedures. The communications interface 280 may comprise the appropriate physical connectors to connect with a corresponding communications medium, whether wired or wireless.

A network may be utilized as a vehicle of communication. In various aspects, the network may comprise local area networks (LAN) as well as wide area networks (WAN) including without limitation the Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 280 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 280 may comprise a wireless interface comprising (e.g., including) one or more antennas, transmitters, receivers, transceivers, amplifiers, filters, control logic, and so forth.

In various aspects, the communications interface 280 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFD) protocols and devices. Other suitable protocols may comprise Ultra Wide Band (UWB), Digital Office (DO), Digital Home, Trusted Platform Module (TPM), ZigBee, and so forth.

Figure 3A:
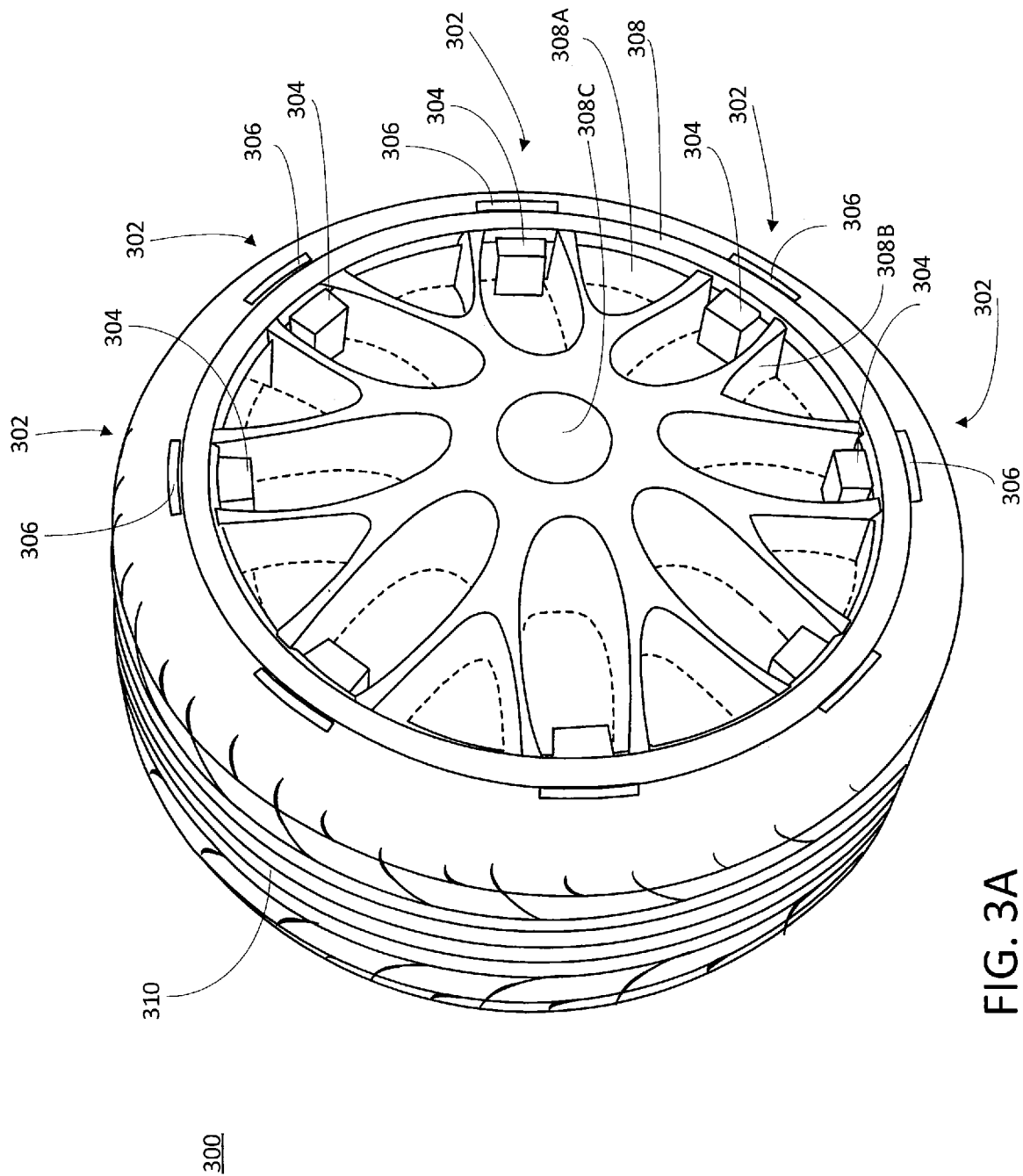
FIG. 3A is a perspective illustration of a smart wheel, in accordance with various embodiments.

FIG. 3A is a perspective illustration of a smart wheel 300, in accordance with various embodiments. The smart wheel 300 may include at least one sensor platform 302. Each sensor platform 302 may include a sensor housing 304 and an energy harvesting component 306. As will be discussed further below, each sensor platform may be supported (e.g., be positioned along) a rotatable component 308 of the smart wheel 300. The rotatable component 308 may include, for example, a rim of the smart wheel 300 within which a circumference of the rotatable component 308 is bound. Although each sensor platform may include a single sensor housing 304 and a single energy harvesting component 306 in certain embodiments, any number of sensor housings and energy harvesting components may be implemented in a sensor platform as desired for different applications in various embodiments. For example, other embodiments may include multiple sensor housings for each energy harvesting component and yet further embodiments may include multiple energy harvesting components for each sensor housing. Although certain embodiments describe the sensor housing 304 as being located directly on a rim 308A of the smart wheel 300 (e.g., on the rim of the rotatable component 308 of the smart wheel 300), the sensor housing may also be located in other parts of a smart wheel 300 as desired for different applications in various embodiments. For example, the sensor housing (and the constituent sensors) may be located closer to the center of the rotatable component 308, such as along the spokes 308B of the rotatable component 308 or around the center 308C (e.g., proximate a cap) of the rotatable component 308 in particular embodiments.

The energy harvesting component 306 may be positioned along the rotatable component 308 (e.g., a rim) of the smart wheel 300 in a manner configured to capture a kinetic energy in response to a compressive force acting on a flexible component 310 (e.g., a pneumatic or inflatable tire, tube, etc.) of the smart wheel 300 making contact with a road or object as the rotatable component 308 rotates. In certain embodiments, the energy harvesting component 306 and/or the sensor platform 302 may be visible from a lateral side of a vehicle or smart wheel 300 (e.g., adjacent a lateral sidewall of the vehicle or smart wheel 300). However, in other embodiments, the energy harvesting component 306 and/or the sensor platform 302 may not be visible from the lateral side of the vehicle or smart wheel 300. The energy harvested by the energy harvesting component 306 may be used to power various components of the sensor platform 302, such as various sensors and/or communication interfaces within the sensor housing 304.

In various embodiments, the energy harvesting component 306 may be positioned on a side wall of the rotatable component 308. For example, the energy harvesting component 306 may be positioned between a bead area of the flexible component 310 (e.g., a tire, tube, belt, etc.) and the rotatable component 308 (e.g., a rim, wheel, shaft, etc.). Accordingly, the flexible component 310 may be mounted on the rotatable component 308. The energy harvesting component 306 may generate energy resulting from compressive force of transport acting on the bead area of the flexible component 310 (e.g., tire, tube, etc.).

Figure 3B:
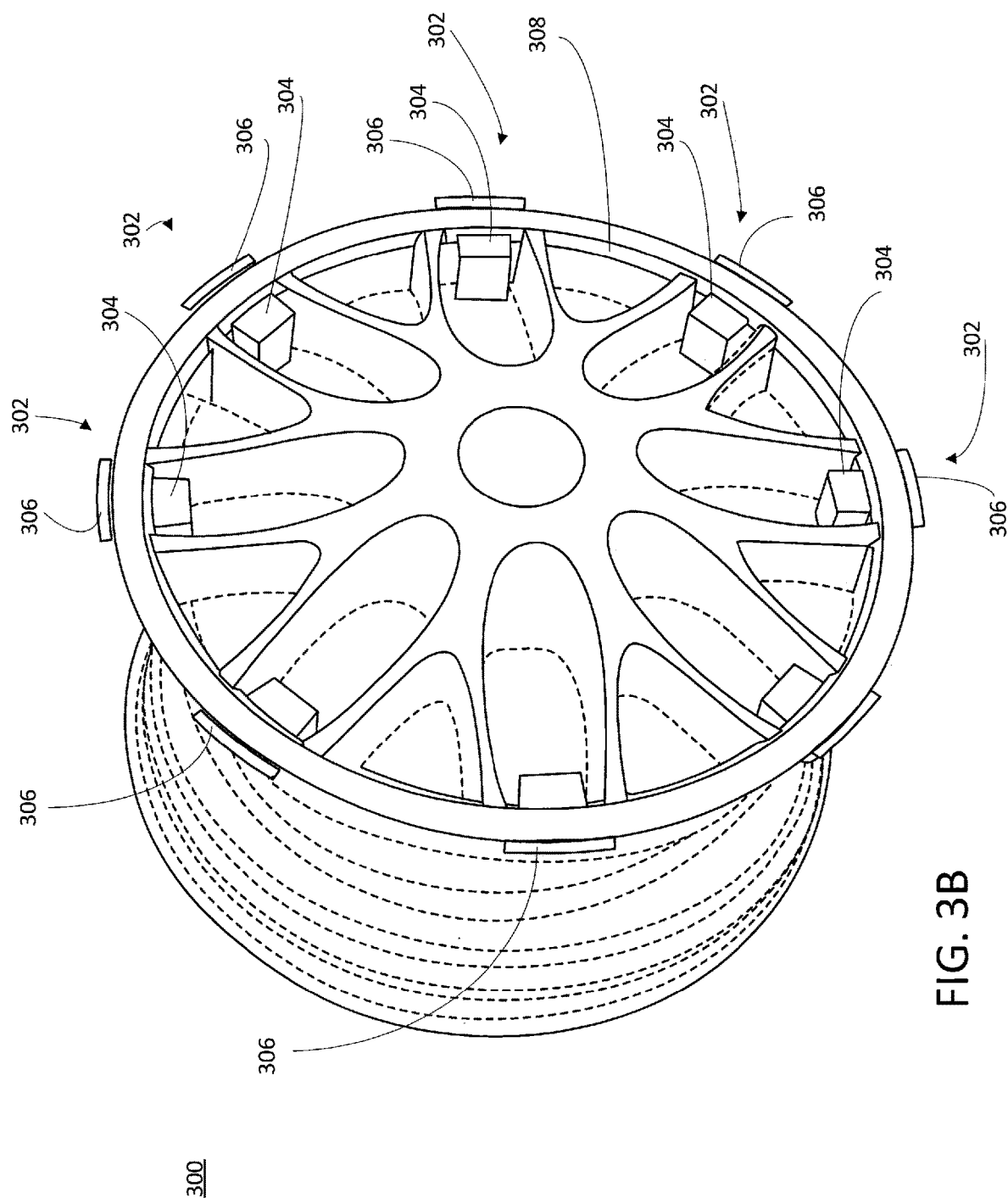
FIG. 3B is a perspective illustration of the smart wheel without the flexible component, in accordance with various embodiments.

FIG. 3B is a perspective illustration of the smart wheel 300 without the flexible component, in accordance with various embodiments. As illustrated, the energy harvesting component 306 may be positioned around a circumference of the rotatable component 308. Accordingly, the energy harvesting component 306 may generate energy resulting from compressive force of a moving object (e.g., a vehicle, acting on the bead area of the tire mounted on the rotatable component 308). In some embodiments, the compressive force may be due to loading (e.g., acceleration, deceleration, etc.). As such, the location of the compressive force may vary depending on the loading. In further embodiments, the energy harvesting component 306 may capture a kinetic energy of the transport moving in response to the rotatable component 308 rotating. For example, the energy harvesting component may include an energy harvesting material and be part of a transducer, a piezo energy harvester and the like. Accordingly, the energy harvesting component 306 may generate energy when mechanical stress is applied to the energy harvesting component 306.

Figure 4:
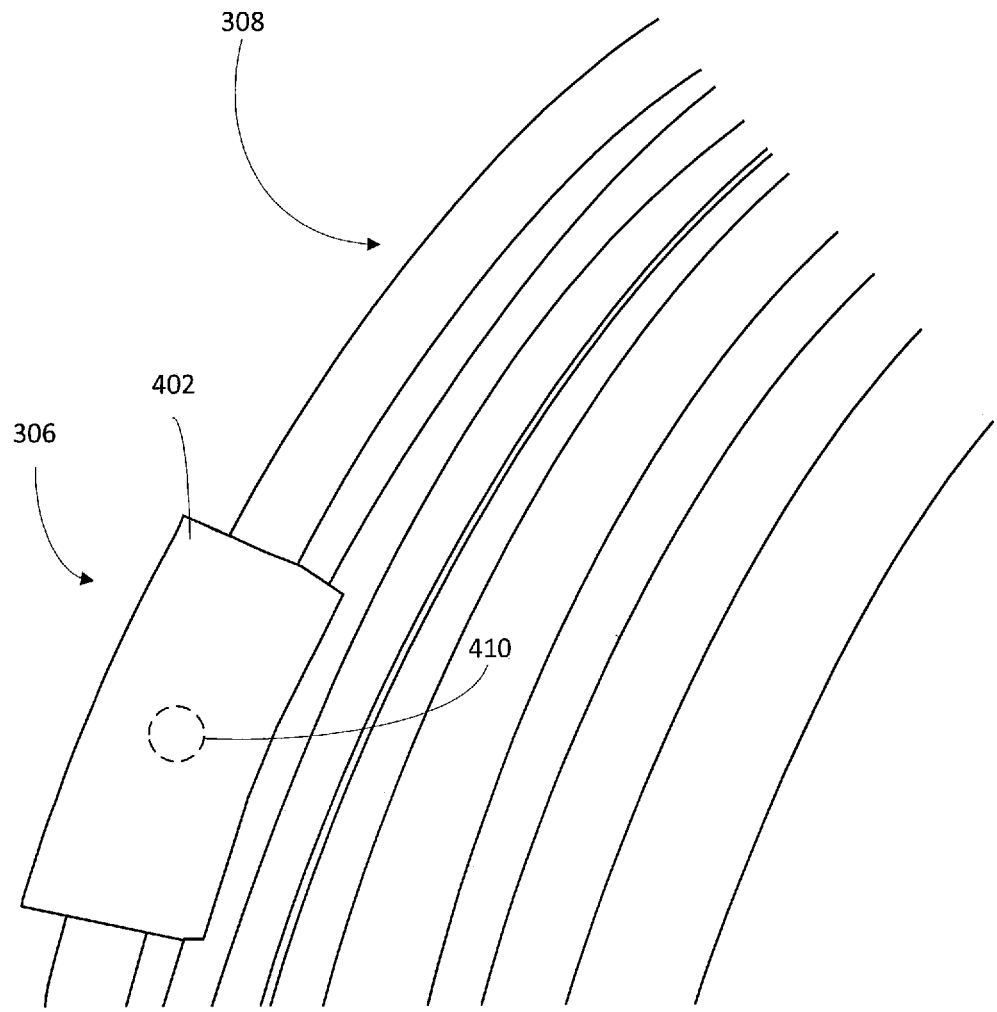
FIG. 4 is a perspective illustration of an energy harvesting component, in accordance with various embodiments.

FIG. 4 is a perspective illustration of the energy harvesting component 306, in accordance with various embodiments. The energy harvesting component 306 may be positioned along a circumference of the rotatable component 308 (e.g., the rim). The energy harvesting component 306 may include a backing portion 402 that contacts the rotatable component 308. The backing portion 402 may support an energy harvesting material. The energy harvesting material may be, for example, a piezoelectric material or other material or transducer that may convert a mechanical deformation into energy.

The energy harvesting component 306 may also include a conductive pin 410 (illustrated in phantom) that may connect the energy harvesting component to a sensor housing (discussed further below). This conductive pin 410 may be connected to the energy harvesting material so as to transfer electric potential produced by the energy harvesting material to the sensor housing. Accordingly, the conductive pin 410 may include a conductive material to transfer the energy produced by the energy harvesting material to the sensor housing.

FIG. 5A illustrates a perspective view of the sensor housing 304 with a conductive pin 410, in accordance with various embodiments. The sensor housing 304 may include a curved feature 502 to conform the sensor housing 304 with a curvature of the rotatable component. The sensor housing 304 may include a cover 504 that may be removably attached to a main portion 506 of the sensor housing 304. For example, the cover 504 may be removably attached to the main portion 506 of the sensor housing 304 via screws, a latch, or any other type of removable attachment device that may attach the cover 504 to the main portion 506. Also, the main portion 506 may include a gasket 508 to prevent the ingress of undesirable particulate (e.g., water, snow, salt, dirt, or other ambient particulates).

Figure 5B:
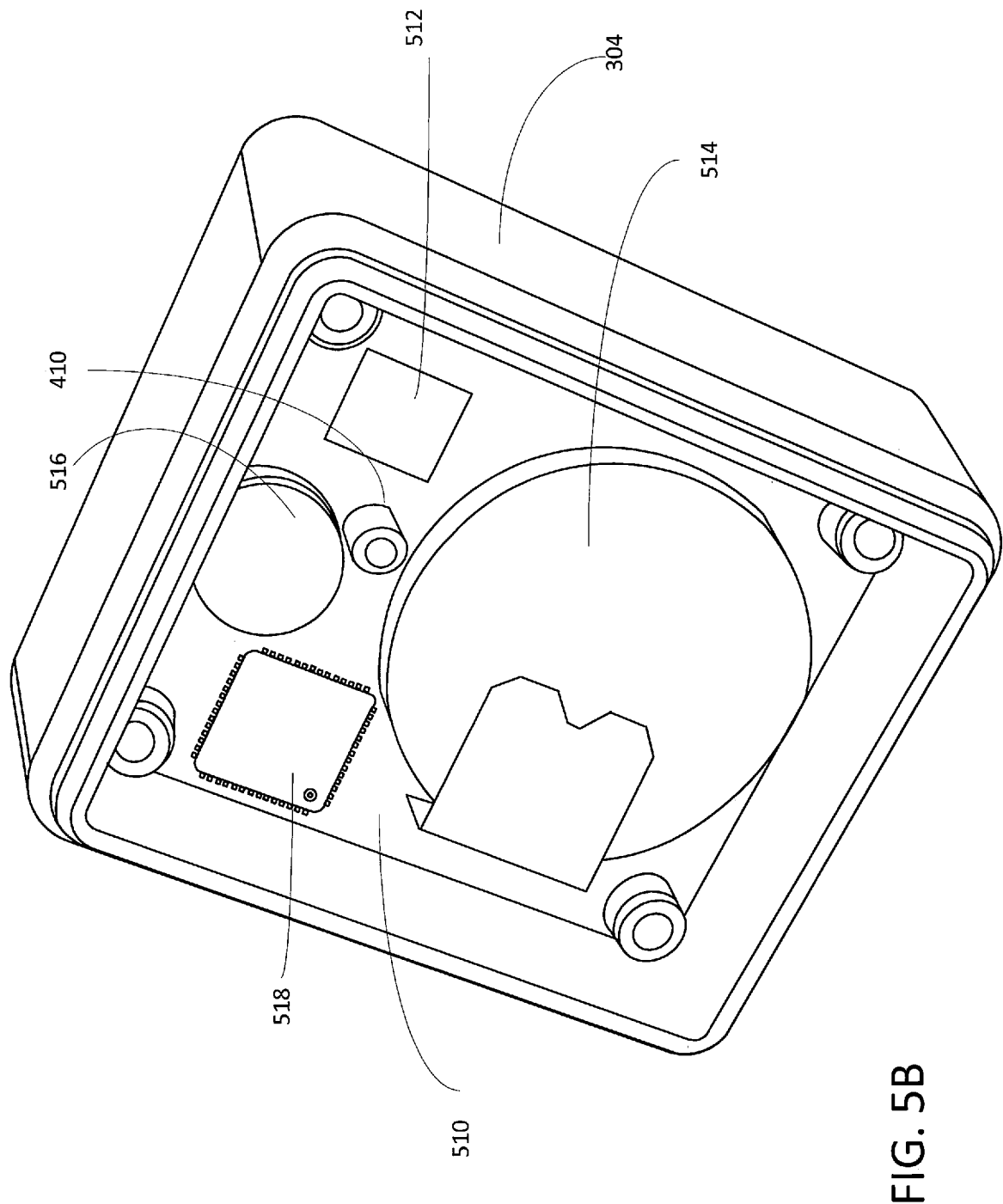
FIG. 5B illustrates a perspective view of a sensor integrator platform within the sensor housing, in accordance with various embodiments.

FIG. 5B illustrates a perspective view of a sensor integrator platform 510 within the sensor housing 304, in accordance with various embodiments. The sensor integrator platform 510 may integrate various sensors 512 together within the sensor housing 304 along with functional modules such as, for example, a battery 514 or other energy storage medium configured to store energy produced by the energy harvesting material, as received via the conductive pin 410. In certain embodiments, the sensor integrator platform 510 may include a system bus (e.g., a conductive element of a printed circuit board) that connects the various portions of the sensor integrator platform 510 together.

Furthermore, the sensor integrator platform may include other functional modules, such as a communications interface 516 to communicate the sensor data captured by the various sensors of the sensor integrator platform 510 to a local smart wheel server. This communications interface may include, for example, a communications interface for data offload (e.g., via millimeter and/or gigahertz wavelength communications) to a local smart wheel server, to other vehicles, an infrastructure (e.g., a remote network) and/or user devices. As a further example, this communication interface may facilitate wireless communications, such as via Bluetooth, radio frequency, radio wave, ultrasonic, and/or any other type of communication protocol or medium. This communication interface may be configured to communicate with, for example, on board electronic control units (ECUs) and/or advanced driver-assistance (ADAS) systems on a vehicle. Additionally, the sensor integrator platform 510, optionally, may include a processor 518 or any other circuitry to facilitate the collection, communication, and/or analysis of sensor data produced by the constituent sensors of the sensor integrator platform 510.

Various types of sensors may be integrated with the sensor integrator platform 510, in accordance with various embodiments. For example, the sensor integrator platform may include a shock sensor that may sense an amount of electric potential produced by the energy harvesting component. The shock sensor may be configured to wake up, or otherwise activate the sensors and/or functional modules of the sensor integrator platform when a sufficient amount of electric potential is produced by the energy harvesting component. Stated another way, the shock sensor may include the energy harvesting component such that the shock sensor is configured to transition various sensors and/or functional modules of the sensor integrator platform from a low power or inactive state to a powered on or active state based on the energy harvesting component producing more than a threshold amount of energy in response to mechanical deformation. In certain embodiments, the energy sensed by the shock sensor may be stored in a battery for standby power when the energy harvesting component is not producing any energy (e.g., when there is no mechanical stress applied to the energy harvesting component).

In particular embodiments, the sensor integrator platform 510 may include a height sensor configured to produce barometric pressure sensor data. Accordingly, this height sensor may be a barometric sensor or a barometric air pressure sensor that may measure atmospheric pressure, which may be indicative of an altitude or height. This barometric pressure sensor data may be utilized, for example, to determine a height of a smart wheel from a point of reference such as a road and/or relative to other smart wheels of a vehicle. This may allow for determination of roll over risk or a flat tire. As noted above, height sensors on a smart wheel may be on a rotatable component of a wheel and thus not on a chassis of a vehicle. Thus, such height sensors may be able to provide barometric pressure sensor data on which side (e.g., which smart wheel) initiated a roll over (e.g., when such barometric pressure sensor data is produced and recorded in a continuous or semi continuous manner). Furthermore, road conditions, such as pot holes, can be more accurately sensed by barometric sensor data produced by a smart wheel, in comparison to sensor data produced from a static part of a chassis of a vehicle.

In further embodiments, the sensor integrator platform 510 may include an acoustic sensor configured to produce acoustic sensor data. Accordingly, this acoustic sensor may be any type of acoustic, sound, or vibrational sensor such as a geophone, a microphone, a seismometer, and a sound locator, and the like. The acoustic sensor data may be utilized for audio pattern recognition, such as to sense an audio signature of a brake or a rotor of a rotatable component (e.g., a wheel). This may be used for predicting a vehicle servicing schedule and/or to produce performance optimization data. More specifically, the acoustic sensor data may be analyzed to identify and/or monitor for unique signatures for different breaking and wear out conditions.

In various embodiments, the sensor integrator platform 510 may include an image sensor configured to produce image sensor data from variable attenuation of waves. Examples of image sensors may include are semiconductor charge-coupled devices (CCD) or active pixel sensors in complementary metal-oxide-semiconductor (CMOS) or N-type metal-oxide-semiconductor (NMOS) technologies. In various embodiments, a sensor platform that includes an image sensor may include a lens, or other transparent medium on which the light waves are focused from outside of the sensor housing 304 onto the image sensor. In particular embodiments, this image sensor may be more specifically an time of flight sensor to capture time of flight data that may characterize a time of flight (TOF). This time of flight sensor may be, for example, an ultrasonic TOF sensor configured to collect ultrasonic TOF sensor data. As a more specific example, an image sensor may function as a camera for determination of a visibility of tire tread depth for assessment of tire performance and optimization. Such an image sensor that captures image data characterizing a tire tread depth may also be positioned in a manner such that image data of a tire tread may be captured (e.g., by having such an image sensor capture image data characterizing a tread depth of a smart tire that the image sensor is located on, or of a tire that the image sensor is not located on). As another specific example, an image sensor may include a infrared image sensor for authentication or identification. This infrared sensor may be utilized, for example, to scan for characteristics of a local environment or local object (e.g., a person approaching a vehicle) for authentication.

In particular embodiments, the sensor integrator platform 510 may include a gas sensor configured to produce gas sensor data. This gas sensor may be any type of sensor to monitor and characterize a gaseous atmosphere. For example, the gas sensor may utilize any of a variety of mechanisms for gas detection, such as an electrochemical gas sensor, a catalytic bead gas sensor, a photoionization gas sensor, an infrared point gas sensor, a thermographic gas sensor, a semiconductor gas sensor, an ultrasonic gas sensor, a holographic gas sensor, and the like. These gas sensors may, for example detect for certain types of gases, such as exhaust gases, explosive gases (e.g., for battery failure detection), atmospheric humidity, air quality, particulates, a pH level, and the like.

In particular embodiments, the sensor integrator platform 510 may include a magnetic sensor configured to produce magnetic sensor data. This magnetic sensor maybe, for example, a magnetometer that measures magnetism for navigation using magnetic field maps (e.g., inside a building or within a closed environment).

In additional embodiments, the sensor integrator platform 510 may include an accelerometer sensor configured to produce acceleration sensor data and/or a gyroscope sensor configured to produce gyroscopic sensor data. This acceleration sensor data and/or gyroscopic sensor data may be utilized for navigation, such as to determine an amount of acceleration for the application of emergency brake systems. In certain embodiments, the accelerometer sensor and/or gyroscope sensor may be part of an inertial navigation system (INS) located on a smart wheel.

Figure 6:
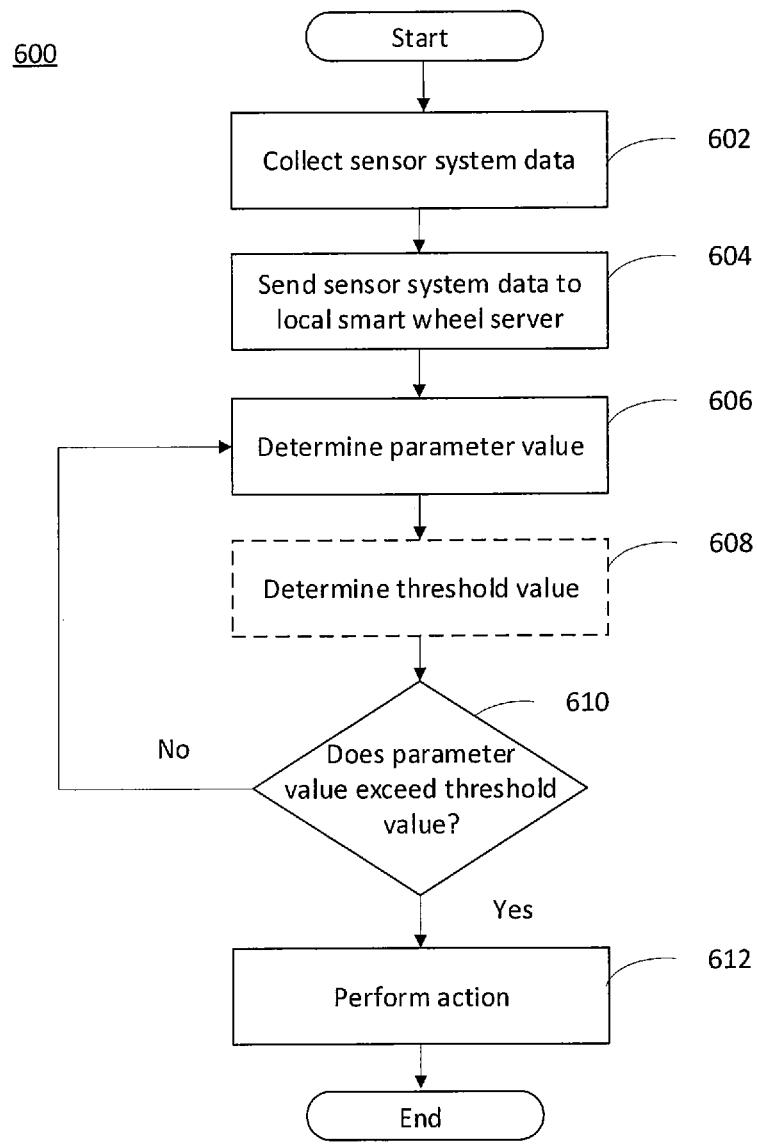
FIG. 6 is a flow chart of a smart wheel process, in accordance with various embodiments.

FIG. 6 is a flow chart of a smart wheel process 600, in accordance with various embodiments. The process 600 may be performed at a smart wheel sensor system of multiple sensor platforms arrayed on respective smart wheels in communication with a local smart wheel server, as introduced above. It is noted that the process 600 is merely an example, and is not intended to limit the present disclosure. Accordingly, it is understood that additional operations (e.g., blocks) may be provided before, during, and after the process 600 of FIG. 6, certain operations may be omitted, certain operations may be performed concurrently with other operations, and that some other operations may only be briefly described herein.

At block 602, smart wheel sensor system data may be collected locally from various sensors on sensor platforms at a rotatable component of a smart wheel. As discussed above, a smart wheel may be a wheel of a vehicle with a local network connected sensor system of at least one sensor arrayed on the wheel itself. The smart wheel sensor system may include multiple types of sensors, which may each be configured to collect different types of smart wheel sensor system data. For example, the smart wheel sensor system may include a height sensor configured to produce barometric pressure sensor data; an acoustic sensor configured to produce acoustic sensor data; an image sensor configured to produce image sensor data; a gas sensor configured to produce gas sensor data; a magnetic sensor configured to produce magnetic sensor data; an accelerometer sensor configured to produce acceleration sensor data; a gyroscope sensor configured to produce gyroscopic sensor data; and a humidity sensor configured to produce humidity sensor data.

In certain embodiments, these sensors may be woken up by a shock sensor that may sense an amount of energy produced by an energy harvesting component also on the smart wheel.

At block 604, the smart wheel sensor system data may be communicated locally to a local smart wheel server from the sensor platforms arrayed on a smart wheel. This communication may be made via a communications interface. This communications interface may enable devices to communicate with each other over one or more communication networks following certain communication protocols, such as TCP/IP, http, https, ftp, and sftp protocols. Accordingly, the communications interface may include any suitable hardware, software, or combination of hardware and software that is capable of coupling the respective sensor platforms with the local smart wheel server. The communications interface may be arranged to operate with any suitable technique for controlling information signals using a desired set of communications protocols, services or operating procedures. In certain embodiments, this communications interface may be separate from a controller area network (CAN) bus, and thus have lower latency than communications across the CAN bus.

At block 606, the smart wheel sensor system data may be analyzed or processed to determine a parameter value. This parameter value may characterize any type of real world parameter, such as an elevation, a sound pattern or sound level, an image pattern in an image or video, the amount of a type of gas, an orientation around a magnetic object, an amount of accelerator, an amount of angular velocity, a humidity level, and the like.

In certain embodiments, this parameter value may characterize a combination (e.g., an expression with inputs taken from) of types of local smart wheel sensor system data and/or a combination of local smart wheel sensor system data with other data accessible to the local smart wheel server. For example, this parameter value may characterize a combination of one or more of: barometric pressure sensor data; acoustic sensor data; image sensor data; gas sensor data; magnetic sensor data; acceleration sensor data; gyroscopic sensor data; humidity sensor data, and the like. As another example, this parameter value may characterize a combination of local smart wheel sensor system data with other data, whether predetermined (e.g., vehicle build and other specifications) or received from outside of local smart wheel sensor system data (e.g., remote data, such as GPS data received from a satellite or data received from a remote server over a remote network).

For example, the smart wheel sensor system data may include barometric pressure sensor data that may be utilized to determine an elevation parameter value. This elevation parameter value may characterizes an elevation of a smart wheel off of a reference point (e.g., a ground elevation) and/or relative to other smart wheels of a particular vehicle. As another example, the smart wheel sensor system data may include acoustic sensor data (e.g., sound) that may be utilized to determine an audio parameter value. This audio parameter value may characterize a sound detectible at the rotatable component. As another example, the parameter value may take into consideration (e.g., reflect) any of a variety of inputs, such as mileage, wheel dynamics, tire pressure, load conditions, road conditions, balancing information, height conditions, ambient sounds, brake dynamics, and the like.

In various embodiments, a parameter value may represent a probability (e.g., a probability of failure) as determined via application of a statistical model determined or trained by the local smart wheel server and/or a remote server. This statistical model may be trained using historical aggregated data (e.g., historical aggregated data of the local smart wheel sensor system or among multiple smart wheel sensor systems). This training may be produced using machine learning techniques (e.g., via supervised or unsupervised learning). These machine learning techniques may be, for example, decision tree learning, association rule learning, artificial neural networks, deep structured learning, inductive logic programming, support vector machines, cluster analysis, Bayesian networks, representation learning, similarity learning, sparse dictionary learning, learning classifier systems, and the like. Then, this statistical model may be applied to new or current smart wheel sensor data, to determine current parameter values (e.g., probabilities of failure). Such a statistical model may account for hidden variables, interaction variables, and the like to express such a probability. For example, these probabilities may represent a probability of brake pad failure (e.g., brake pad erosion), a prediction of rollover (e.g., a dangerous wheel elevation) and the like.

At block 608, the local smart wheel server may determine a threshold value. In certain embodiments, these threshold values may be determined on the fly and determined alongside a determination of whether a parameter value meets (e.g., exceeds) a threshold value. However, in other embodiments, threshold determination may be done prior to a determination of whether a parameter value meets a threshold value. Thus, block 608 is illustrated with dotted lines. In certain embodiments, the determination of parameter values may include retrieving predetermined parameter values from memory or from a remote server.

In various embodiments, a threshold value may be determined for each type of parameter value. For example, there may be separate threshold values for each, or a combination of, barometric pressure sensor data; acoustic sensor data; image sensor data; gas sensor data; magnetic sensor data; acceleration sensor data; gyroscopic sensor data; humidity sensor data, and the like. A threshold value may characterize, for example, a threshold amount of elevation, a threshold value of a particular sound pattern or sound level (e.g., where meeting a particular sound pattern or sound level would meet the threshold value), a threshold value of a particular image pattern in an image or video (e.g., where meeting a particular image pattern would meet the threshold value), a threshold value (e.g., amount) of a particular type of gas, a threshold value orientation around a magnetic object (e.g., a particular orientation, such as a particular north, south, east, or west compass orientation), a threshold value of acceleration, a threshold value of angular velocity, a threshold value of humidity, and the like.

As noted above, parameter values may be determined in accordance with a statistical analysis of a dataset of parameter values. For example, the parameter values may be aggregated across different criteria, such as different times (e.g., as historical parameter values) by types of parameter value (e.g., elevation, a sound pattern or sound level, an image pattern in an image or video, the amount of a type of gas, an orientation around a magnetic object, an amount of accelerator, an amount of angular velocity, a humidity level, and the like), different smart wheels, different sensor platforms, different vehicles, and the like. As another example, a parameter value may represent a probability as determined by a statistical model. In certain embodiments, by analyzing the aggregated data from various criteria, a threshold value may be determined based on detection of an outlier from the parameter values. In certain embodiments, these outliers may determine threshold values, which when met, may define an adverse condition. These outliers may be determined in accordance with a conventional statistical analysis for outliers. For example, a threshold value may be set as an outlier among various probabilities (e.g., a probability value that is an outlier).

At block 610, a decision may be made as to whether any parameter values meet any associated threshold values. As introduced above, a parameter (e.g. a parameter value) may not necessarily represent a single value, but may also represent a pattern of values and/or a range or spectrum of values. If yes, the process 600 may proceed to block 612. If no, the process 600 may return to block 606.

At block 608, an action may be performed in response to a parameter value meeting a threshold value. In certain embodiments, the action may be taken when a particular parameter value meets a particular threshold value. Accordingly, the action taken may be based on the particular parameter value that is met. The action taken may be, for example, the production of an alert for a driver of a vehicle or other operator of the vehicle, the application of an emergency brake system (e.g., activation of either pre breaking or full breaking), the activation of a particular safety or driving system, a notification of an unsafe driving condition associated with a driver in an online database, and the like.

For example, as noted above, an elevation parameter value may characterizes an elevation of a smart wheel off of a reference point (e.g., a ground elevation) and/or relative to other smart wheels of a particular vehicle. The meeting of the elevation parameter value with a threshold value amount of elevation may be indicative of an imminent turn over due to wheel elevation and thus provoke an action of an alert for a driver. As another example, as noted above, an audio parameter value may characterize a sound detectible at the rotatable component. The meeting of the audio parameter value with a threshold value of a particular sound pattern or sound level (e.g., where meeting a particular sound pattern or sound level would meet the threshold value) may be indicative of imminent brake failure due to rotor-shoe erosion noise or of tire tread erosion approaching dangerous levels. Meeting such an audio parameter threshold value may thus provoke an action of an alert for a driver or operator of a vehicle.

Although various embodiments referred to in connection with FIG. 6 and further below may describe processing of sensor data at a local smart wheel server, in other embodiments the smart wheel sensor system may process sensor data that is sent to a remote smart wheel server via a remote network. As discussed above in connection with FIG. 1, this processing of sensor data may be similar to that only performed locally at the local smart wheel server but be performed by a combination of both the local smart wheel server and the remote smart wheel server.

Figure 7:
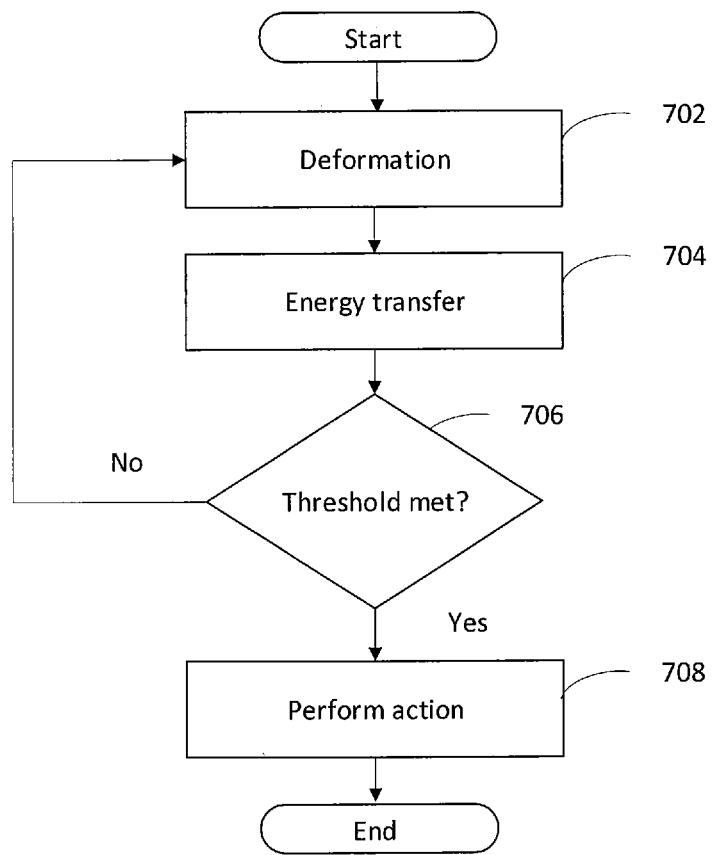
FIG. 7 is a flow chart of a shock sensor process, in accordance with various embodiments.

FIG. 7 is a flow chart of a shock sensor process 700, in accordance with various embodiments. The process 700 may be performed at a smart wheel sensor system that integrates at least one shock sensor, as introduced above. The shock sensor may represent the components of the smart wheel sensor system configured to perform the process 700. It is noted that the process 700 is merely an example, and is not intended to limit the present disclosure. Accordingly, it is understood that additional operations (e.g., blocks) may be provided before, during, and after the process 700 of FIG. 7, certain operations may be omitted, certain operations may be performed concurrently with other operations, and that some other operations may only be briefly described herein.

At block 702, an energy harvesting component may deform (e.g., mechanically deform) to generate energy resulting from compressive force of a moving object (e.g., a vehicle, acting on the bead area of the tire mounted on the rotatable component). Stated another way, the energy harvesting component may capture a kinetic energy of a transport moving in response to the rotatable component rotating. For example, the energy harvesting component may include an energy harvesting material and be part of a transducer, a piezo energy harvester and the like. Accordingly, the energy harvesting component may generate energy when mechanical stress, is applied to the energy harvesting component. For example, this energy may be in the form of an alternating current (AC) signal, which can be rectified into a direct current (DC) signal.

At block 704, the energy generated by the energy harvesting component may be transferred to a sensor integrator platform of a sensor platform that includes the energy harvesting component. As noted above, this energy may be transferred by, for example, a pin made of a conductive material (e.g., a conductive pin) to transfer the energy from the energy harvesting component to the sensor integrator platform.

For ease of explanation, block 706 may represent a summarized counterpart of blocks 604-610 of FIG. 6 specifically for the shock sensor process of FIG. 7. Returning to FIG. 7, at block 706, a decision may be made as to whether the transferred energy from the energy harvesting component meets a threshold. The transferred energy may be processed into (e.g., represented as) an energy parameter and analyzed by an energy threshold sensor (e.g., a local processor or local hardware on the sensor integrator platform) and/or in conjunction with a local smart wheel server, which may receive communications that include the energy parameter. The energy threshold sensor and/or the local smart wheel server may determine whether the transferred energy (e.g., as represented as the energy parameter) meets a threshold (e.g., an energy parameter threshold). This threshold may represent a particular value (e.g., voltage or current) of the transferred energy. In certain embodiments, this threshold may represent a level of energy sufficient to power certain sensors within a sensor integrator platform. In other embodiments, this threshold may represent a predetermined amount of energy that may trigger an alert or other action. The process 700 may return to block 702 if the transferred energy does not meet the threshold. However, the process 700 may proceed to block 708 when the transferred energy meets the threshold.

At block 708, an action may be performed based on the transferred energy meeting the threshold. This action may be taken by, for example, the various sensors on a sensor integrator platform in communication with the local smart wheel server and/or the energy threshold sensor. In various embodiments, the action may be to wake up, or otherwise activate the sensors of the sensor integrator platform when a sufficient amount of energy is produced by the energy harvesting component, as represented by the energy parameter meeting the threshold. Furthermore, as noted above, the threshold may represent a level of energy sufficient to power sensors within a sensor integrator platform. Thus, the sensors within the sensor integrator platform may be turned on once a sufficient amount of energy is generated to power the sensors of the sensor integrator platform (e.g., once the threshold is met). In certain illustrative embodiments, these sensors powered on in such a manner may be on a smart wheel that is part of a bicycle moving along the ground or a locomotive moving along a train track.

In further embodiments the shock sensor may be configured to note (e.g., to record or to trigger an alert or notification for presentation in a user interface) when the amount of energy produced by the energy harvesting component meets the threshold. As noted above, the threshold may represent a predetermined amount of energy that may trigger an alert or other action in certain embodiments. This alert may be a recording saved in the memory of the smart wheel sensor system or an alert presentable in a user interface that indicates that the amount of energy produced by the shock sensor meets the threshold. In certain illustrative embodiments, the alert may represent a certain amount of pressure sensed at a smart wheel sensor system, such as due to an aircraft landing that uses a smart wheel configured to contact the ground to determine when the aircraft has touched down.

Figure 8:
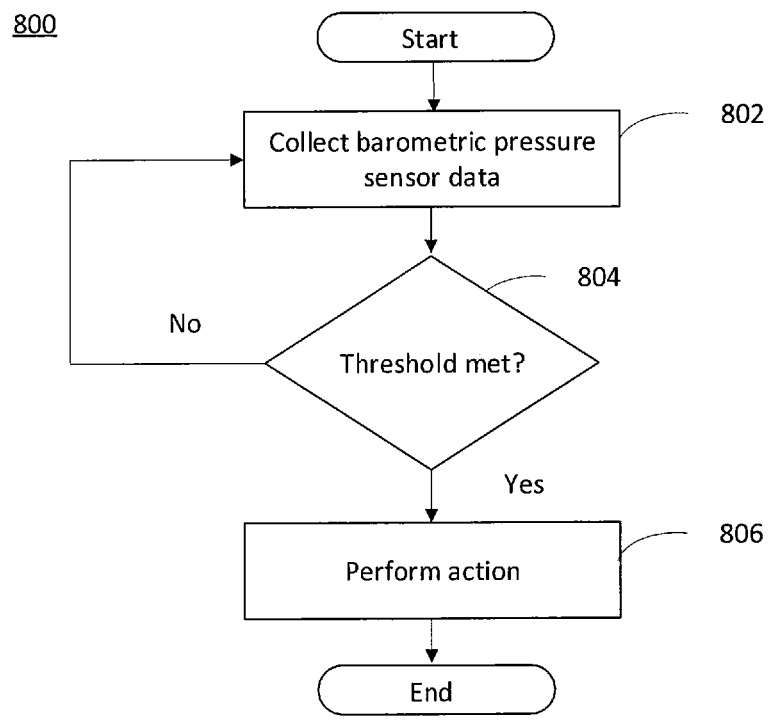
FIG. 8 is a flow chart of a height sensor process, in accordance with various embodiments.

FIG. 8 is a flow chart of a height sensor process 800, in accordance with various embodiments. The process 800 may be performed at a smart wheel sensor system configured to produce barometric pressure sensor data, as introduced above. It is noted that the process 800 is merely an example, and is not intended to limit the present disclosure. Accordingly, it is understood that additional operations (e.g., blocks) may be provided before, during, and after the process 800 of FIG. 8, certain operations may be omitted, certain operations may be performed concurrently with other operations, and that some other operations may only be briefly described herein.

At block 802, a height sensor on a smart wheel may produce barometric pressure sensor data. This height sensor may measure atmospheric pressure, which may be indicative of an altitude or height. In certain embodiments, this barometric pressure sensor data may be specific to individual smart wheels associated with a single vehicle.

For ease of explanation, block 804 may represent a summarized counterpart of blocks 604-610 of FIG. 6 specifically for the height sensor process 800 of FIG. 8. Returning to FIG. 8, at block 804 a decision may be made as to whether a height parameter based on the barometric pressure sensor data meets a threshold. The barometric pressure sensor data may be processed into (e.g., represented as) an height parameter and analyzed by a local smart wheel server, which may receive communications that includes the barometric pressure sensor data and/or height parameter. The local smart wheel server may determine whether the barometric pressure sensor data (e.g., as represented as the height parameter) meets a threshold (e.g., a height parameter threshold). In certain embodiments, the barometric pressure sensor data may be processed by conversion to a height parameter and compared with a threshold (e.g., a threshold altitude) to determine whether the smart wheel is operating at a particular threshold altitude. In other embodiments, the barometric pressure sensor data may be processed by conversion to a height parameter as a differential between altitudes of different smart wheels (e.g., an altitude differential) and compared with a threshold (e.g., a threshold altitude differential) to determine whether the attitude differential between smart wheels meets (e.g., meets or passes) a threshold (e.g., the threshold altitude differential). The process 800 may return to block 802 when no threshold is met. However, the process 800 may proceed to block 806 when a threshold is met.

At block 806, an action may be performed based on the height parameter (e.g., representation of barometric pressure sensor data) meeting a threshold (e.g., meeting or passing the height parameter threshold). In various embodiments, this action may be the triggering of an alert that is saved in memory of the smart wheel sensor system or provided to a user interface.

In certain embodiments, the alert may be indicative of smart wheel operation at or beyond a particular threshold altitude. This may be when the barometric pressure sensor data is processed by conversion to a height parameter and compared with a threshold (e.g., a threshold altitude) to determine whether the smart wheel is operating at a particular threshold altitude.

In further embodiments, the alert may be indicative of smart wheel operation at or beyond a particular threshold altitude differential. As noted above, such an alert may be triggered when barometric pressure sensor data is processed by conversion to a height parameter as a differential between altitude's of different smart wheels (e.g., an altitude differential) and compared with a threshold (e.g., a threshold altitude differential) to determine whether the attitude differential between smart wheels meets (e.g., meets or passes) a threshold (e.g., the threshold altitude differential). This alert may be, for example, an alert for an imminent roll over, passage of a pot hole, flat tire, or other road condition as dependent upon the particular threshold altitude differential met. As a more specific example, the alert may be for a driving or road condition indicative of a vehicle about to roll over due to certain smart wheels of the vehicle being too far off of the ground. In further embodiments, the alert may be for a driving or road condition indicative of rough road conditions such as deep potholes or uneven pavement on a road. In yet further embodiments, the alert may be for a driving or road condition indicative of driving or use of a smart wheel with a flat tire.

Figure 9A:
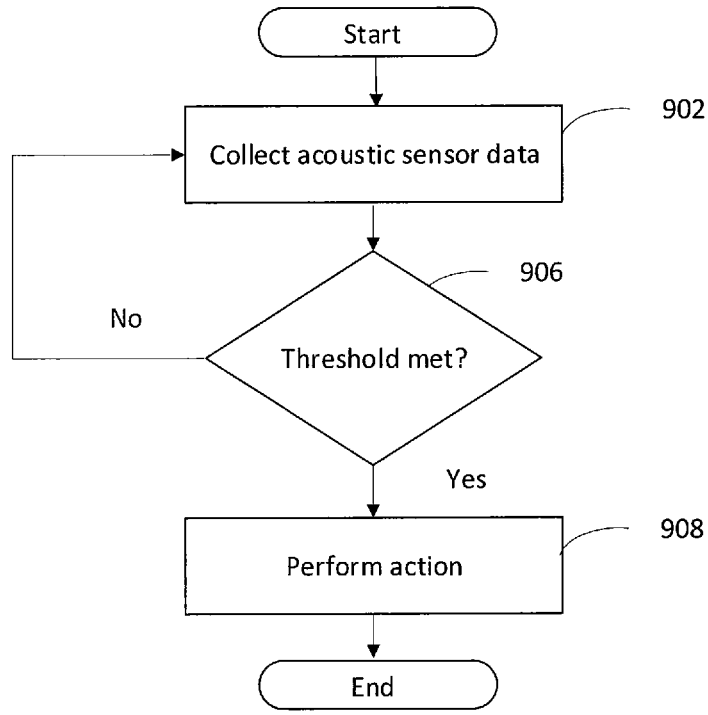
FIG. 9A is a flow chart of an acoustic sensor alert process, in accordance with various embodiments.

FIG. 9A is a flow chart of an acoustic sensor alert process 900, in accordance with various embodiments. The process 900 may be performed at a smart wheel sensor system that integrates at least acoustic sensor configured to produce acoustic sensor data, as introduced above. It is noted that the process 900 is merely an example, and is not intended to limit the present disclosure. Accordingly, it is understood that additional operations (e.g., blocks) may be provided before, during, and after the process 900 of FIG. 9, certain operations may be omitted, certain operations may be performed concurrently with other operations, and that some other operations may only be briefly described herein.

At block 902, an acoustic sensor on a smart wheel may produce acoustic sensor data. This acoustic sensor may be any type of acoustic, sound, or vibrational sensor such as a geophone, a microphone, a seismometer, and a sound locator, and the like. This acoustic sensor data may characterize an acoustic pattern detectible by an acoustic sensor on a smart wheel.

For ease of explanation, block 904 may represent a summarized counterpart of blocks 604-610 of FIG. 6 specifically for the acoustic sensor alert process 900 of FIG. 9A. Returning to FIG. 9A, at block 904 a decision may be made as to whether an acoustic parameter based on the acoustic sensor data meets a threshold. The acoustic sensor data may be processed into (e.g., represented as) an acoustic parameter and analyzed by a local smart wheel server, which may receive communications that includes the acoustic sensor data and/or acoustic parameter. The local smart wheel server may determine whether the acoustic sensor data (e.g., as represented as the acoustic parameter) meets a threshold (e.g., an acoustic threshold). In certain embodiments, the acoustic sensor data may be processed by conversion to an acoustic parameter and compared with a threshold (e.g., an acoustic threshold) to determine whether the smart wheel is operating at a particular threshold acoustic environment. In certain embodiments, the acoustic parameter may represent an audio pattern (e.g., via audio pattern recognition), such as to sense an audio signature of a brake or a rotor of a rotatable component (e.g., a wheel). As noted above, the audio parameter threshold may be any threshold determined from an analysis of the acoustic sensor data, such as a decibel level detected by the acoustic sensor and/or a specific audio signature. The process 900 may return to block 902 when no threshold is met. However, the process 900 may proceed to block 906 when a threshold is met.

At block 906, an action may be performed based on the acoustic parameter (e.g., representation of acoustic sensor data) meeting a threshold (e.g., meeting or passing the acoustic parameter threshold). In various embodiments, this action may be the triggering of an alert that is saved in memory of the smart wheel sensor system or provided to a user interface.

In certain embodiments, the alert may be indicative of a breaking situation (e.g., emergency breaking) or an explosion or crash of a nearby vehicle. As another example, the alert may be indicative of an audio signature of a brake or a rotor of a rotatable component (e.g., a wheel) that is damaged or in need of repair or replacement. This may be used for predicting a vehicle servicing schedule and/or to produce performance optimization data. In certain embodiments, these acoustic parameter thresholds may be indicative of different breaking and wear out conditions, for which an appropriate alert may be triggered. As yet another example, the alert may be indicative of a smart wheel driving in a wet road condition or a dry road condition (e.g., when the acoustic threshold represents the wet road condition or dry road condition).

Figure 9B:
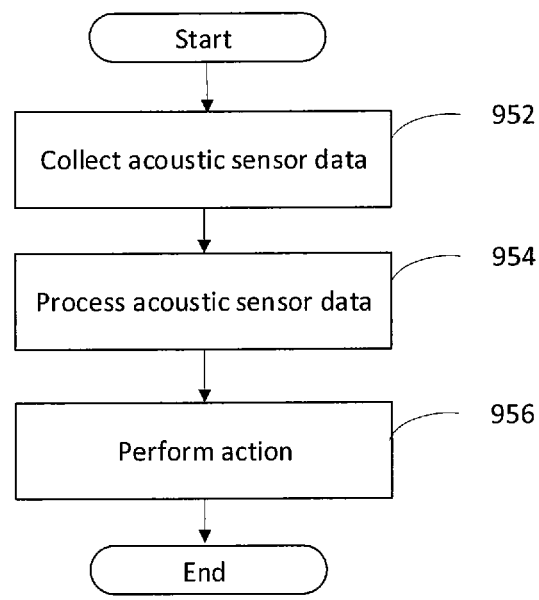
FIG. 9B is a flow chart of a noise cancellation process, in accordance with various embodiments.

FIG. 9B is a flow chart of a noise cancellation process 950, in accordance with various embodiments. The process 950 may be performed at a smart wheel sensor system that integrates at least one speaker and at least one acoustic sensor configured to produce acoustic sensor data, as introduced above. It is noted that the process 950 is merely an example, and is not intended to limit the present disclosure. Accordingly, it is understood that additional operations (e.g., blocks) may be provided before, during, and after the process 950 of FIG. 9B, certain operations may be omitted, certain operations may be performed concurrently with other operations, and that some other operations may only be briefly described herein.

At block 952, an acoustic sensor on a smart wheel may produce acoustic sensor data. This acoustic sensor may be any type of acoustic, sound, or vibrational sensor such as a geophone, a microphone, a seismometer, and a sound locator, and the like. This acoustic sensor data may characterize an acoustic pattern detectible by an acoustic sensor on a smart wheel.

At block 954, the acoustic sensor data may be sent to, and processed by, a processor of a local smart wheel server that communicates with the acoustic sensor. The processing may produce a destructive acoustic pattern that is 180 degrees out of phase with the acoustic pattern of the acoustic sensor data.

At block 956, an action may be performed where a speaker at a vehicle (e.g., within a passenger cabin or compartment of the vehicle) that includes the smart wheel that produced the acoustic sensor data may emit the destructive acoustic pattern. The destructive acoustic pattern may produce destructive interference of the acoustic pattern to reduce the amount of ambient noise experienced within the vehicle (e.g., within the passenger cabin or compartment of the vehicle).

Figure 10A:
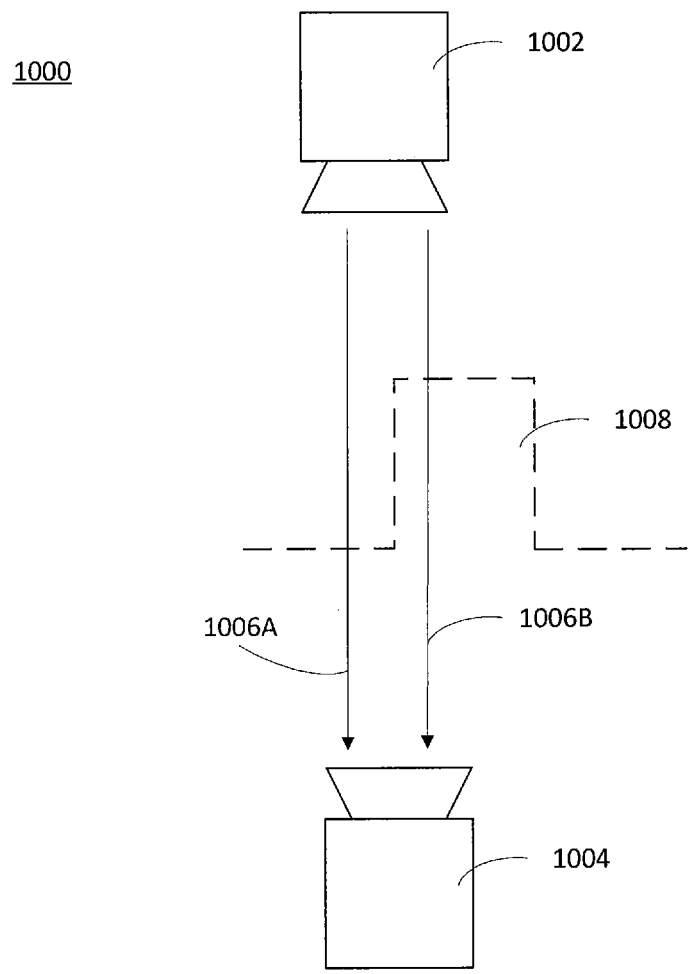
FIG. 10A is a block diagram that illustrates a principle of operation for a time of flight sensor of a sensor platform, in accordance with various embodiments.

FIG. 10A is a block diagram that illustrates a principle of operation for a time of flight sensor 1000 of a sensor platform, in accordance with various embodiments. The time of flight sensor may include an emitter 1002 and a receiver 1004. The emitter 1002 may emit, for example, ultrasonic waves 1006A, 1006B that may be received by the receiver 1004 after passing through a medium, such as a tire 1008. The tire 1008 is illustrated with a thread (e.g., a structural contour) and in dotted lines to indicate that the ultrasonic waves 1006A, 1006B may pass through the tire 1008. Accordingly, the ultrasonic waves 1006A, 1006B may have different exposures to the tire 1008 and effectively have different times of flight (e.g., where ultrasonic wave 1006A may have a different time of flight than ultrasonic wave 1006B) when received by the receiver 1004. This differential may be based on the differences in thickness of the thread of the tire 1008. For example, a thicker thread may have a greater differential (e.g., due to less wear of a tire's thread) than a more worn out thread that is thinner. Accordingly, the thickness of a tire's tread (and thus its state of wear) may be detected based on the differential between the times of flight of the ultrasonic waves 1006A, 1006B. In various embodiments, the receiver 1004 may be housed in a sensor platform of a smart wheel such that the receiver 1004 may be configured to produce sensor data in conjunction with the emitter 1002 on a vehicle body.

Figure 10B:
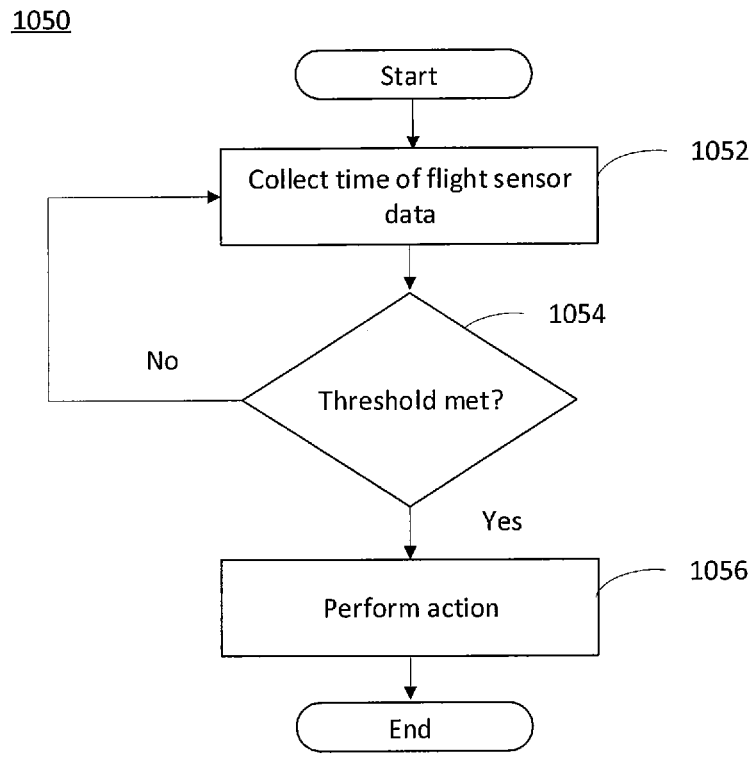
FIG. 10B is a flow chart of a time of flight sensor process, in accordance with various embodiments.

FIG. 10B is a flow chart of a time of flight sensor process 1050, in accordance with various embodiments. The process 1050 may be performed at a smart wheel sensor system that integrates at least one time of flight sensor configured to produce time of flight sensor data, as introduced above. It is noted that the process 1050 is merely an example, and is not intended to limit the present disclosure. Accordingly, it is understood that additional operations (e.g., blocks) may be provided before, during, and after the process 1050 of FIG. 10B, certain operations may be omitted, certain operations may be performed concurrently with other operations, and that some other operations may only be briefly described herein.

At block 1052, a time of flight sensor on a smart wheel may produce time of flight sensor data. This time of flight sensor data may be specific to individual smart wheels associated with a single vehicle. This time of flight sensor data may characterize time of flight differences between signals (e.g., ultrasonic signals) sent from an emitter and received by a receiver. These signals may pass through a tire (e.g., a medium). This tire may have treads, or structural contours such that the signals may have different amounts of exposure to the medium and thus different times of flight before detection by the receiver.

For ease of explanation, block 1054 may represent a summarized counterpart of blocks 604-610 of FIG. 6 specifically for the time of flight sensor process 1050 of FIG. 10B. Returning to FIG. 10B, at block 1054 a decision may be made as to whether a time of flight parameter based on the time of flight sensor data meets a threshold. The time of flight sensor data may be processed into (e.g., represented as) the time of flight parameter and analyzed by a local smart wheel server, which may receive communications that includes the time of flight sensor data and/or time of flight parameter. The local smart wheel server may determine whether the time of flight sensor data (e.g., as represented as the time of flight parameter) meets a threshold (e.g., a time of flight parameter threshold). In various embodiments this analysis may be a determination of a differential in the time of flight between different signals. In certain embodiments, the time of flight sensor data may be processed by conversion to a time of flight parameter and compared with a threshold (e.g., a threshold time of flight) to determine whether the smart wheel is operating at a tread depth that is low (e.g., low as compared to an ideal tread depth and/or a new tire). The process 1050 may return to block 1052 when no threshold is met. However, the process 1050 may proceed to block 1056 when a threshold is met.

At block 1056, an action may be performed based on the time of flight parameter (e.g., representation of time of flight sensor data) meeting a threshold (e.g., meeting or passing the time of flight threshold). In various embodiments, this action may be the triggering of an alert that is saved in memory of the smart wheel sensor system or provided to a user interface. In certain embodiments, the alert may be indicative of the thickness of a tire tread (e.g., the structural contours) that may be sufficiently low to warrant a tire change to avoid tire wear out.

In various embodiments, a sensor platform may include various communication interfaces as an ancillary interface for communication with the local smart wheel server. These communication interfaces may include, for example, a millimeter wave and/or a wireless communications interface. The millimeter wave communications interface may communicate using wavelengths in the order of millimeters and thus have a range of, for example, a few meters from the communications interface. As noted above, the sensor platform of a smart wheel may be located on a rim of a smart wheel. Thus the millimeter wave communications interface may also communicate with other devices (e.g., other smart wheel sensor systems mounted on other vehicles not mounted with the smart wheel) within the range of the millimeter wave communications interface located on the rim of the smart wheel. Similarly, the wireless communications interface may be any type of wireless communications interface that may communicate with the local smart wheel server over a wireless communication that bypasses a physical CAN bus of a vehicle.

Figure 11:
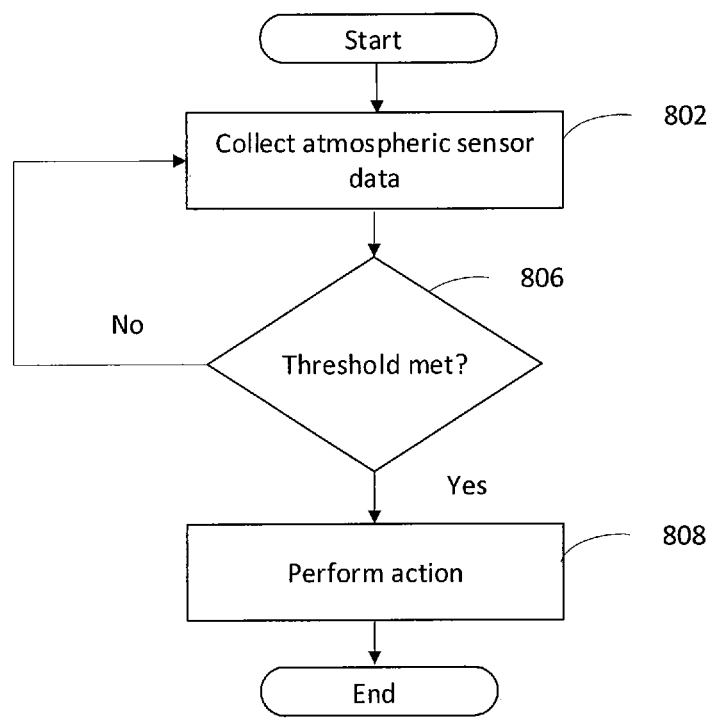
FIG. 11 is a flow chart of an atmospheric sensor process, in accordance with various embodiments.

FIG. 11 is a flow chart of an atmospheric sensor process 1100, in accordance with various embodiments. The process 1100 may be performed at a smart wheel sensor system that integrates at least one atmospheric sensor configured to produce atmospheric sensor data. Reference to an atmospheric sensor may refer to any or a combination of a gas sensor, a humidity sensor, and/or a particulate sensor as introduced above. It is noted that the process 1100 is merely an example, and is not intended to limit the present disclosure. Accordingly, it is understood that additional operations (e.g., blocks) may be provided before, during, and after the process 1100 of FIG. 11, certain operations may be omitted, certain operations may be performed concurrently with other operations, and that some other operations may only be briefly described herein.

At block 1102, an atmospheric sensor on a smart wheel may produce atmospheric sensor data. This atmospheric sensor data may characterize a local atmosphere from the perspective of the atmospheric sensor disposed on the smart wheel.

In various embodiments, this atmospheric sensor may represent, for example, a gas sensor, a humidity sensor, and/or a particulate sensor as introduced above. Similarly, this atmospheric sensor data may represent, for example, gas sensor data, humidity sensor data, and/or particulate sensor data, as introduced above. The gas sensor data may characterize the presence and/or concentration of a gas (e.g., helium, argon, nitrogen, oxygen, and/or any other type of gas). The humidity sensor data may characterize a humidity level (e.g., an amount of water vapor in the air). The particulate sensor data may characterize the presence and/or concentration of a particulate (e.g., particulates given off from the burning of oil gasoline or other fuels, exhaust fumes, smog, air pollution, battery failure emissions, and the like).

For ease of explanation, block 1104 may represent a summarized counterpart of blocks 604-610 of FIG. 6 specifically for the atmospheric sensor process 1100 of FIG. 11. Returning to FIG. 11, at block 1104 a decision may be made as to whether an atmospheric parameter based on the atmospheric sensor data meets a threshold. The atmospheric sensor data may be processed into (e.g., represented as) the atmospheric parameter and analyzed by a local smart wheel server, which may receive communications that includes the atmospheric sensor data and/or atmospheric parameter. The local smart wheel server may determine whether the atmospheric sensor data (e.g., as represented as the atmospheric parameter) meets a threshold (e.g., an atmospheric parameter threshold). In certain embodiments, the atmospheric sensor data may be processed by conversion to a atmospheric parameter and compared with a threshold (e.g., an atmospheric threshold) to determine whether the smart wheel is operating within a specific atmospheric environment. For example, the threshold may be a threshold concentration of a particular gas, a threshold humidity level, and/or a threshold concentration of a particular particulate. In further embodiments, the threshold (e.g., the atmospheric threshold) may represent an unsafe or undesirable atmospheric condition. The process 1100 may return to block 1102 when no threshold is met. However, the process 1100 may proceed to block 1106 when a threshold is met.

At block 1106, an action may be performed based on the atmospheric parameter (e.g., representation of atmospheric sensor data) meeting a threshold (e.g., meeting or passing the atmospheric threshold). In various embodiments, this action may be the triggering of an alert that is saved in memory of the smart wheel sensor system or provided to a user interface. In certain embodiments, the alert may be indicative of the presence of a unique and/or dangerous atmospheric condition. In particular embodiments, the alert may be indicative of a concentration of a particular gas (e.g., helium, argon, nitrogen, oxygen, and/or any other type of gas) meets a threshold concentration (e.g., when the helium, argon, nitrogen, oxygen, and/or any other type of gas reaches an unsafe or undesirable level of concentration). As another example, the alert may be indicative of a humidity level that meets a threshold humidity level (e.g., when the humidity of a sensed environment is too high or too low). As another example, the alert may be indicative of a concentration of a particulate (e.g., particulates given off from the burning of oil gasoline or other fuels, exhaust fumes, smog, air pollution, battery failure emissions, and the like) that meets a threshold particulate concentration (e.g., when particulates given off from the burning of oil gasoline or other fuels, exhaust fumes, smog, air pollution, battery failure emissions, and the like reaches an unsafe or undesirable level of concentration).

In various embodiments, a smart wheel may include an infrared tag or marking. This infrared tag may be a unique identifier for the smart wheel, such as a smart wheel identifier which may be utilized to uniquely identify a particular smart wheel. This infrared tag may include an expression (e.g., as a pattern, barcode, numeric sequence, alphanumeric sequence, and the like) of the smart wheel identifier as imprinted on the smart wheel in, for example, infrared readable ink. The expression in infrared readable ink may be read using an infrared sensor.

In particular embodiments, a smart wheel may include magnetic sensors configured to produce magnetic sensor data. These magnetic sensors may be part of a sensor platform (e.g., as located on a sensor integrator platform of the sensor platform). These magnetic sensor may be, for example, a magnetometer that measures magnetism for navigation using magnetic field maps. For example, a magnetic field map of an enclosed area within a building may be provided to a vehicle (e.g., a drone) that includes a smart wheel sensor system with magnetic sensors. The various magnetic sensors on each respective smart wheel may be utilized to sense the magnetic field within the enclosed area and navigate the enclosed area in reference to the magnetic field map of the enclosed area.

In specific embodiments, a smart wheel may include an inertial measurement unit (IMU) and/or an inertial navigation system (INS) as part of a sensor platform. This IMU and/or INS may include at least one an accelerometer sensor configured to produce acceleration sensor data and/or a gyroscope sensor configured to produce gyroscopic sensor data. This acceleration sensor data and/or gyroscopic sensor data may be utilized for navigation, such as to determine an amount of acceleration for the application of emergency brake systems. In certain embodiments, the sensor data produced by the IMU and/or INS may be utilized to augment other sensing systems (e.g., systems that produce and/or act upon sensor data). For example, the IMU and/or NS within a sensor platform on a smart wheel may produce sensor data that may be utilized to characterize the rotations per minute of the smart wheel, which may be already sensed by other sensors on a vehicle. In particular embodiments, this sensor data may bypass a CAN bus of the vehicle and be communicated wirelessly to a local smart wheel server.

Figure 12:
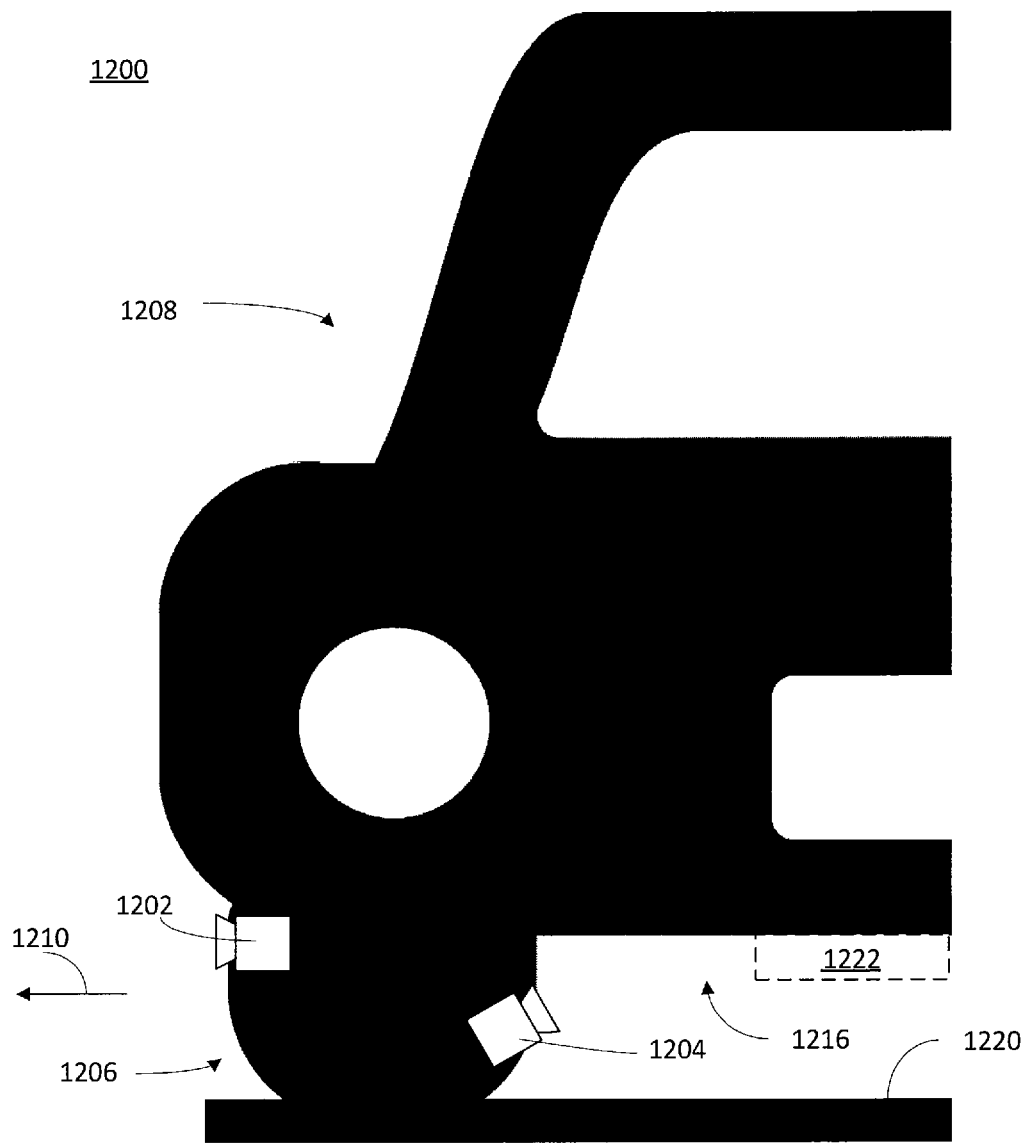
FIG. 12 is a block diagram that illustrates an outer image sensor and an inner image sensor as arrayed on a smart wheel, in accordance with various embodiments.

FIG. 12 is a block diagram 1200 that illustrates an outer image sensor 1202 and an inner image sensor 1204 as arrayed on a smart wheel 1206, in accordance with various embodiments. The smart wheel 1206 may be part of a vehicle 1208 that utilizes the smart wheel 1206 for motion. The outer image sensor 1202 may be disposed on the smart wheel 1206 (e.g., on a sensor platform) in a manner to collect sensor data from an outer lateral side 1210 of the vehicle 1208. Accordingly, this outer image sensor 1202 may be utilized to collect image data that characterizes the outer lateral side 1210 of the vehicle 1208. For example, the outer image sensor 1202 may capture image data of the outer lateral side 1210 of the vehicle 1208 while smart wheel 1206 that the outer image sensor 1202 is on is either in motion or still (e.g., not in motion). In certain embodiments, the outer image sensor 1202 may be utilized for sensing of an environment around the vehicle 1208, as captured by the field of view of the outer image sensor 1202.

In particular embodiments, an inner image sensor 1204 may be disposed on the smart wheel 1206 (e.g., on a sensor platform) in a manner to collect image sensor data from a bottom 1216 (e.g., undercarriage) of the vehicle 1208. Stated another way, the inner image sensor 1204 may have the bottom 1216 of the vehicle 1208 within the field of view of the inner image sensor 1204 so as to collect image data that characterizes the bottom 1216 of the vehicle 1208. In certain embodiments, this inner image sensor 1204 may be angled in a manner so as to best capture the bottom 1216 of the vehicle 1208 in the inner image sensor's field of view. For example, the inner image sensor 1204 and the outer image sensor 1202 may have different angular orientations relative to an axis across which the ground 1220 extends.

In certain embodiments, the inner image sensor 1204 may be utilized for characterizing a state of the bottom 1216 of the vehicle 1208, as captured by the field of view of the inner image sensor 1204. For example, the inner image sensor 1204 may be utilized to determine whether part of the bottom 1216 of the vehicle is broken or if a foreign object 1222 (e.g., a bomb or other undesirable object) has been attached to the bottom 1216 of the vehicle.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be, implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:
1. A system, comprising:
   a vehicle body;
   a rotatable component configured to rotate relative to the vehicle body, wherein the rotatable component comprises a tire and a rim coupled to the tire;
   a first energy harvesting component comprising a piezoelectric material, wherein the piezoelectric material is positioned between a bead area of the tire and the rim, and wherein the first energy harvesting component is configured to generate electric power resulting from compressive forces acting on the bead area of the tire, wherein the compressive forces result from the vehicle body imparting a load on the bead area as the vehicle body moves;
   a first sensor configured to produce sensor data by using the electric power while disposed on the rotatable component;
   a conductive member configured to couple the first energy harvesting component with a housing of the first sensor, wherein the conductive member extends through a wall of the rim and is configured to transfer the electric power generated by the first energy harvesting component to the first sensor; and
   at least one processor disposed within the vehicle body, the at least one processor configured to perform an action based on a parameter value meeting a threshold value, wherein the parameter value is based on the sensor data.

2. The system of claim 1, wherein the rim comprises an outer facing surface opposite an inner facing surface in which the circumference of the rotatable component is bound, wherein the first sensor is located within the housing along the inner facing surface.

3. The system of claim 2, wherein at least a portion of the first energy harvesting component is located along the outer facing surface.

4. The system of claim 2, wherein the first sensor housing comprises multiple sensors within the housing.

5. The system of claim 2, wherein the housing is adjacent a sidewall of the rim.

6. The system of claim 2, wherein the housing comprises a cover configured to be removably attached to reveal the sensor.

7. The system of claim 1, wherein the tire when inflated is configured to transfer the force to the rotatable component resulting from compressive force acting on a portion of the tire making contact with a road, wherein the first energy harvesting component is configured to capture a kinetic energy in response to the compressive force acting on the portion of the tire making contact with the road as the rotatable component rotates, wherein the first energy harvesting component is configured to power the first sensor.

8. The system of claim 7, wherein the first energy harvesting component comprises an energy harvesting material configured to deform in response to the compressive force.

9. The system of claim 7, wherein energy harvested by the first energy harvesting component is configured to activate the sensor.

10. The system of claim 1, further comprising:
   a plurality of rims that are each configured to rotate relative to the vehicle body, wherein the rotatable component comprises one of the plurality of rims; and
   a plurality of sensors that are configured to produce combined sensor data while disposed on different rims, wherein the sensor is one of the plurality of sensors, wherein the at least one processor is further configured to:
      receive the combined sensor data, and
      determine the parameter value from the combined sensor data.

11. The system of claim 10, wherein the at least one processor is further configured to determine an outlier value as the threshold value using a statistical model applied to the combined sensor data.

12. A method, comprising:
receiving, at a processor located within a vehicle body, sensor data from a first sensor powered by force applied to a rotatable component, wherein the first sensor is configured to produce sensor data while disposed on the rotatable component, wherein the rotatable component is configured to rotate relative to the vehicle body and comprises a tire and a rim coupled to the tire;
coupling a first energy harvesting component to the first sensor via a conductive member, wherein the first energy harvesting component comprises a piezoelectric material positioned between a bead area of the tire and the rim, wherein the first energy harvesting component is configured to generate electric power resulting from compressive force acting on the bead area of the tire, wherein the compressive forces result from the vehicle body imparting a load on the bead area as the vehicle body moves, and wherein the conductive member extends through a wall of the rim and is configured to transfer the energy generated by the first energy harvesting component to the first sensor;
determining a parameter value based on the sensor data; and
performing an action based on the parameter value meeting a threshold value.

13. The method of claim 12, wherein the first sensor is at least one of:
a height sensor configured to produce barometric pressure sensor data,
an acoustic sensor configured to produce acoustic sensor data,
an image sensor configured to produce image sensor data,
a gas sensor configured to produce gas sensor data,
a magnetic sensor configured to produce magnetic sensor data,
an accelerometer sensor configured to produce acceleration sensor data,
a gyroscope sensor configured to produce gyroscopic sensor data, and
a humidity sensor configured to produce humidity sensor data.

14. The method of claim 12, wherein the parameter value is based on the sensor data and data received from a remote server.

15. The method of claim 12, wherein the first sensor is configured to send the sensor data to the processor via a wireless connection.

16. The method of claim 15, wherein the wireless connection bypasses a vehicle bus.

17. The system of claim 1, further comprising:
a plurality of energy harvesting components each coupled to a first surface of the rim, wherein the plurality of energy harvesting components includes the first energy harvesting component; and
a plurality of sensors each coupled to a second surface of the rim, wherein the plurality of sensors includes the first sensor,
wherein each of the plurality of energy harvesting components is configured to generate electric power resulting from compressive forces acting on the tire and provide the electric power to a respective one of the plurality of sensors via a conductive member that extends through the wall of the rim.

18. The system of claim 17, wherein the plurality of sensors comprises at least two different types of sensors selected from a group consisting of:
a height sensor configured to produce barometric pressure sensor data,
an acoustic sensor configured to produce acoustic sensor data,
an image sensor configured to produce image sensor data,
a gas sensor configured to produce gas sensor data,
a magnetic sensor configured to produce magnetic sensor data,
an accelerometer sensor configured to produce acceleration sensor data,
a gyroscope sensor configured to produce gyroscopic sensor data, and
a humidity sensor configured to produce humidity sensor data.

19. The method of claim 1, further comprising:
coupling a plurality of energy harvesting components to respective ones of a plurality of sensors via respective conductive members, wherein the plurality of energy harvesting components are each coupled to a first surface of the rim and includes the first energy harvesting component, and the plurality of sensors are each coupled to a second surface of the rim and includes the first sensor,
wherein each of the plurality of energy harvesting components is configured to generate electric power resulting from compressive forces acting on the tire and provide the electric power to a respective one of the plurality of sensors via a respective conductive member that extends through the wall of the rim.

20. The method of claim 19, wherein the plurality of sensors comprises at least two different types of sensors selected from a group consisting of:
a height sensor configured to produce barometric pressure sensor data,
an acoustic sensor configured to produce acoustic sensor data,
an image sensor configured to produce image sensor data,
a gas sensor configured to produce gas sensor data,
a magnetic sensor configured to produce magnetic sensor data,
an accelerometer sensor configured to produce acceleration sensor data,
a gyroscope sensor configured to produce gyroscopic sensor data, and
a humidity sensor configured to produce humidity sensor data.

* * * * *